United States Patent
Guthmann et al.

(10) Patent No.: US 11,929,835 B2
(45) Date of Patent: Mar. 12, 2024

(54) CONTROL SIGNALING FOR HIGH RELIABILITY CHANNEL

(71) Applicant: Telefonaktiebolaget LM Ericsson (publ), Stockholm (SE)

(72) Inventors: Axel Guthmann, Kista (SE); Robert Baldemair, Solna (SE); Sorour Falahati, Stockholm (SE); Ali Behravan, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 59 days.

(21) Appl. No.: 17/631,602

(22) PCT Filed: Jul. 1, 2020

(86) PCT No.: PCT/SE2020/050688
§ 371 (c)(1),
(2) Date: Jan. 31, 2022

(87) PCT Pub. No.: WO2021/040597
PCT Pub. Date: Mar. 4, 2021

(65) Prior Publication Data
US 2022/0353023 A1 Nov. 3, 2022

Related U.S. Application Data

(60) Provisional application No. 62/892,218, filed on Aug. 27, 2019.

(51) Int. Cl.
*H04L 1/00* (2006.01)
*H04L 1/1607* (2023.01)
(Continued)

(52) U.S. Cl.
CPC .......... *H04L 1/1861* (2013.01); *H04L 1/1664* (2013.01); *H04L 1/1819* (2013.01);
(Continued)

(58) Field of Classification Search
CPC ... H04L 1/0026; H04L 1/1819; H04L 1/1628; H04L 1/1664; H04L 5/0055;
(Continued)

(56) References Cited

U.S. PATENT DOCUMENTS 10,027,539 B2 * 7/2018 Song ................ H04L 5/003
10,375,722 B2 * 8/2019 Khoryaev ............ H04W 72/23
(Continued)

FOREIGN PATENT DOCUMENTS

WO 2020166916 A1 8/2020

OTHER PUBLICATIONS

International Search Report and Written Opinion dated Oct. 6, 2020 for International Application No. PCT/SE2020/050688 filed Jul. 1, 2020, consisting of 10-pages.
3GPP TSG RAN WG1 Meeting #97 R1-1906609; Title: DCI design for URLLC; Agenda item: 7.2.6.7; Source: Huawei, HiSilicon; Document for: Discussion and Decision; Date and Location: May 13-17, 2019, Reno, USA, consisting of 7-pages.
(Continued)

*Primary Examiner* — Esaw T Abraham
(74) *Attorney, Agent, or Firm* — Christopher & Weisberg, P.A.

(57) ABSTRACT

There is disclosed a method of operating a wireless device in a wireless communication network, the wireless device being triggered for aggregated transmission of first control information associated to a control channel, the aggregated transmission indicating a number R of retransmissions of the first control information to be performed. The method includes transmitting the first control information on a data channel based on a scaling parameter, the scaling parameter being based on the number R of retransmissions. The disclosure also pertains to related devices and methods.

18 Claims, 3 Drawing Sheets

(51) Int. Cl.
*H04L 1/1812* (2023.01)
*H04L 1/1829* (2023.01)
*H04L 5/00* (2006.01)
*H04L 27/26* (2006.01)

(52) U.S. Cl.
CPC .......... *H04L 1/1858* (2013.01); *H04L 5/0053* (2013.01); *H04L 5/0091* (2013.01); *H04L 27/26025* (2021.01); *H04L 5/0026* (2013.01); *H04L 5/0078* (2013.01)

(58) Field of Classification Search
CPC ..... H04L 5/0053; H04L 5/0091; H04L 5/026; H04L 5/0076; H04L 5/0078; H04L 1/1816
See application file for complete search history.

(56) References Cited

U.S. PATENT DOCUMENTS

| | | | |
|---|---|---|---|
| 10,980,044 B2* | 4/2021 | Rico Alvarino | H04L 1/0004 |
| 10,999,861 B2* | 5/2021 | Rico Alvarino | H04L 27/34 |
| 11,019,583 B2* | 5/2021 | Laselva | H04W 56/0005 |
| 2018/0278380 A1 | 9/2018 | Kim et al. | |

OTHER PUBLICATIONS

3GPP TSG RAN WG1 Meeting #97 R1-1907548; Title: UL intra-UE multiplexing between control channel and data channel; Agenda item: 7.2.6.7; Source: Huawei, HiSilicon; Document for: Discussion and Decision; Date and Location: May 13-17, 2019, Reno, USA, consisting of 3-pages.

3GPP TSG RAN WG1 #98 R1-1908799; Discussion on UCI enhancement for URLLC; Agenda item: 7.2.6.2; Source: Panasonic; Document for: Discussion; Date and Location: Aug. 26-30, 2019, consisting of 8-pages.

* cited by examiner

CONTROL SIGNALING FOR HIGH RELIABILITY CHANNEL

CROSS-REFERENCE TO RELATED APPLICATIONS

This application is a Submission Under 35 U.S.C. § 371 for U.S. National Stage Patent Application of International Application No.: PCT/SE2020/050688, filed Jul. 1, 2020 entitled "CONTROL SIGNALING FOR HIGH RELIABILITY CHANNEL," which claims priority to U.S. Provisional Application No. 62/892,218, filed Aug. 27, 2019, entitled "CONTROL SIGNALING FOR HIGH RELIABILITY CHANNEL," the entireties of both of which are incorporated herein by reference.

TECHNICAL FIELD

This disclosure pertains to wireless communication technology, in particular regarding use of transmission resources for uplink transmission.

BACKGROUND

Modern wireless communication systems have many use cases, some of which in particular aim at supporting communication with high latency requirements (aiming at low latency) and high reliability requirements (e.g., low BLER or BER). There are needed approaches allowing such use cases with limited signaling overhead and efficient use of resources.

SUMMARY

It is an object of the present disclosure to provide approaches allowing improved handling of communication resources, in particular for uplink transmission, for example in the context of prioritisation of specific signaling like URLLC signaling, in particular on the physical layer. The approaches are particularly advantageously implemented in a $5^{th}$ Generation (5G) telecommunication network or 5G radio access technology or network (RAT/RAN), in particular according to 3GPP ($3^{rd}$ Generation Partnership Project, a standardisation organization). A suitable RAN may in particular be a RAN according to NR, for example release 15 or later, or LTE Evolution.

There is disclosed a method of operating a wireless device in a wireless communication network. The wireless device is triggered for aggregated transmission of first control information associated to a control channel, the aggregated transmission corresponding to a number R of retransmissions of the first control information to be performed. The method comprises transmitting the first control information on a data channel based on a scaling parameter, the scaling parameter being based on the number R of retransmissions and/or number T of total transmissions and/or one or more transmission quality parameters.

Moreover, a wireless device for a wireless communication network is discussed. The wireless device is adapted for being triggered for aggregated transmission of first control information associated to a control channel, the aggregated transmission corresponding to a number R of retransmissions of the first control information to be performed, the method comprising transmitting the first control information on a data channel based on a scaling parameter, the scaling parameter being based on the number R of retransmissions and/or number T of total transmissions and/or one or more transmission quality parameters.

A method of operating a network node in a wireless communication network is described. The method comprises receiving first control information from a wireless device, the wireless device being triggered for aggregated transmission of the first control information associated to a control channel. The aggregated transmission corresponds to a number R of retransmissions of the first control information to be performed. Receiving first control information comprises receiving the first control information on a data channel based on a scaling parameter, the scaling parameter being based on the number R of retransmissions and/or number T of total transmissions and/or one or more transmission quality parameters.

There is also described a network node for a wireless communication network. The network node is adapted for receiving first control information from a wireless device, the wireless device being triggered for aggregated transmission of the first control information associated to a control channel. The aggregated transmission corresponds to a number R of retransmissions of the first control information to be performed. Receiving comprises receiving the first control information on a data channel based on a scaling parameter, the scaling parameter being based on the number R of retransmissions and/or number T of total transmissions and/or one or more transmission quality parameters.

The approaches described herein facilitate efficient use of data channel resources for transmission of control information, while implementing a demanded reliability level for the control information.

A scaling parameter may also be referred to as, and/or represent and/or be, a scaling factor, or a beta offset, or UCI or HARQ beta, or "n". First control information may also be referred to as first information, and/or second control information may also be referred to as second information. A transmission resource also may be referred to as resource or resource structure in this disclosure. The control channel and/or an associated transmission resource and the data channel and/or an associated transmission resource may be in the same transmission timing structure. The transmission timing structure may in particular be a slot or subslot. The scaling parameter may be determined by the wireless device, and/or by the network node.

To a channel like a control channel or data channel, there may be associated a transmission resource. For example, a control channel resource may be associated to the control channel and/or triggered transmission of first control information, and a data channel resource may be associated to the data channel and/or transmission on a data channel. A control channel resource in some cases may be configured, e.g. to be one of a set of resources, with higher layer signaling like RRC signaling and/or MAC signaling. The control channel resource may be triggered and/or indicated based on a control information message, e.g. a DCI message, which may be a scheduling assignment or grant, for example indicating the resource and/or subject transmission to which control information (e.g., HARQ feedback) pertains to. The data channel resource may be scheduled, e.g. with DCI signaling like a scheduling grant, or may be configured with higher layer signaling, e.g. representing a semi-static or semi-persistent configured grant.

A first transmission quality or priority may be associated to the first control information and/or control channel and/or control channel resource. A second transmission quality and/or priority may be associated to the data channel and/or data channel resource. The first transmission quality or priority may correspond to URLLC. The second transmission quality or priority may be the same as the first, or different, in particular lower and/or associated to eMBB communication. The scaling parameter may be considered to be adapted to accommodate higher priority transmission of control information on the data channel, e.g. providing required reliability.

In general, the scaling parameter may indicate a number of resource elements and/or modulation symbols and/or a code rate and/or (number of) coding bits for transmitting the first control information on the data channel, in particular coding bits for forward error correction (FEC) like polar coding or LDPC. The scaling factor may be configured or configurable, e.g. with higher layer signaling like RRC signaling or MAC signaling, or may be predefined. In some cases, the scaling factor may be indicated with physical layer control information, e.g. DCI signaling, which for example may directly or indirectly indicate the scaling factor, e.g. indexing a table entry of a configured or configurable or predefined table (or simultaneously index entries of different such tables).

A number R of retransmission may correspond to the total number T of transmissions of the first control information less one, such that T=R+1 may hold; the first transmission may be not considered a retransmission. The total number of transmissions may be a number corresponding to a power of 2, e.g. 1, 2, 4, 8, etc. The scaling parameter may be considered to be based on R if it is based on a corresponding other parameter in unique or functional or isomorph relation to R, e.g. if based on T or similar. An aggregated transmission may correspond to R retransmissions being triggered by a common signal or one event, e.g. one DCI message, and/or one common characteristic associated to multiple control messages, e.g. the control channel resource or resource set indicated by multiple scheduling assignments for HARQ feedback, and/or a common signaling characteristic, e.g. CORESET and/or search space and/or DCI format of multiple DCI messages. R may be configured or configurable, e.g. with higher layer signaling like RRC signaling or MAC signaling, or predefined, and/or indicated with DCI, e.g. indexing a prefined and/or configured and/or configurable table.

In some cases, at least part of the retransmissions R may be triggered for transmission in the same slot.

It may be considered that each retransmission is triggered for transmission on the same control channel resource, e.g. in the same slot or subslot, for example if the resource is large enough, e.g. based on a set of resources configured for the control channel.

It may be considered that different retransmissions are triggered for different subslots. The use of subslots allows quick repetitions for low latency, wherein it may be considered that control channel resources may be available in each of the subslots. The data channel resource may in general cover one or more subslots, e.g. depending on scheduling or configuration. Thus, the slot configuration may be optimised.

It may be considered that the scaling parameter is the higher one of a minimum scaling parameter and a scaling parameter indicated with received control signaling. The minimum scaling parameter may be configured or configurable or predefined, and/or be calculated or determined based on one or more transmission quality parameters associated to the triggered control channel transmissions and/or and associated transmission quality. The received control signaling may be physical layer signaling, e.g. DCI signaling, or higher layer signaling, e.g. RRC or MAC signaling.

A transmission quality parameter may in general correspond to the number R of retransmissions and/or number T of total transmissions, and/or coding (e.g., number of coding bits, e.g. for error detection coding and/or error correction coding like FEC coding) and/or code rate and/or BLER and/or BER requirements and/or transmission power level (e.g., minimum level and/or target level and/or base power level PO and/or transmission power control command, TPC, step size) and/or signal quality, e.g. SNR and/or SIR and/or SINR and/or power density and/or energy density.

It may be considered that a number of repetitions Rd of the first control information used for transmitting the first control information on the data channel may be different from R, in particular less than R. Such repetition may occur for example during forward error coding, if the total number of bits that can be used for occupying the resource elements and/or modulation symbols available (based on the scaling parameter) may be large enough to accompany multiple copies, or extended coded bits. Extended coded bits can represent a repetitions of parts or the total coded bit representation of the information and/or error detection coding bits (e.g., CRC) associated to the control information. It should be noted in a code like a polar code, the encoded information bits (and optionally error detection bits) are not necessarily directly kept (non-systemic code), as the coding may represent a mapping of number of information bits (and optionally error detection bits)+coding bits onto the corresponding number of coded bits without a 1-1 association of individual information bits to individual coding bits. Thus, the coded bits may represent the information bits as a whole, but do not directly copy them. For other codes, the coding bits are based on the information bits (and optionally error detection bits) and added thereto, such that the coded bits have an individual representation of the information bits (and optionally error detection bits). Thus, the number of repetitions of the control information may be difficult to discern or even be non-integer (e.g., if only a part of coded bits are repeated).

In some variants, the first control information may be transmitted on two different data channel instances, e.g. in different subslots or slots. However, transmission in the same slot may be considered. The data channel instances may represent a scheduled transmission (e.g., scheduled with a DCI like a scheduling grant) and a configured grant (e.g., configured with RRC signaling, e.g. semi-persistent or semi-static grant). The scaling factor may be the same or different for such transmissions, and/or may consider R and/or the number of transmissions/retransmission of the first control information in each of the data channel transmissions. Thus, data channel resource use may be optimised.

In general, the scaling parameter may be configured or indicated with control signaling, e.g. physical layer signaling like DCI signaling or higher-layer signaling like RRC or MAC signaling.

Transmitting or mapping based on a scaling parameter may in particular represent determining number of resource elements and/or modulation symbols and/or which resource elements and/or modulation symbols to be used for carrying signaling representing the mapped information. The scaling parameter may indicate the coding or code rate to be used, e.g. implicitly or explicitly. The resource elements and/or modulation symbols, and/or their number, may be dependent on the MCS to be used and/or the number of bits of the information to be mapped, and/or the number of bits associated to coding (error coding). Mapping information may comprise mapping all information bits of the information, and/or mapping at least a part of the information bits. In some cases, information bits of one or more types of control information may be dropped, e.g. for measurement information, or specific parts of measurement information, like CSI part II information.

It may be considered that the first control information may comprise one or more types of control information, e.g. HARQ information and/or SR and/or measurement information.

Receiving control information or signaling may comprise monitoring an associated transmission resource (data channel resource) for the control information or signaling, e.g. considering path delays and/or travel time between transmitter and receiver. It may be considered that receiving control information or signaling is based on triggering the wireless device for transmitting the first control information and/or second control information, and/or configuring and/or scheduling the transmission and/or associated resource/s and/or channel transmissions. Receiving the control information may comprise associating signaling carried on the resource elements and/or modulation symbols of the data channel with control information based on the transmission quality parameter and/or R and/or T.

The scaling parameter may comprise a first type scaling parameter associated to a first type of control information, and/or a second type scaling parameter associated to a second type of control information. The first control information may be mapped to the common transmission resource or data channel resource based on the first type scaling parameter for control information of the first type, and based on the second type scaling parameter for control information of the second type. The first type may correspond to acknowledgement information and/or scheduling request, and/or the second type may correspond to measurement information, e.g. aperiodic or periodic measurement information, or measurement information in different parts, e.g., part I and II.

In general, a scaling parameter may be indicated with control signaling, e.g. downlink control signaling. The downlink control signaling or DCI may comprise an indication indexing and/or indicating the scaling parameter. In particular, the indication may index and/or represent one or more configured or configurable or predefined table/s of scaling parameters. The table may be configurable to comprise and/or comprise different scaling parameters for different types of control information and/or transmission qualities.

In some cases, the scaling parameter may be indicated with downlink control signaling. The corresponding indication/s or indicator/s may be in a scheduling grant or assignment scheduling or making available the transmission resource/s of the control channel and/or data channel. It may be considered that the indication/s or indicator/s are included in one or more scheduling assignments scheduling subject transmission to which acknowledgement information of the first control information pertains, and/or triggering the transmission. In particular, the scaling parameter may be indicated in a scheduling assignment scheduling or triggering subject transmission and/or feedback pertaining thereto. Alternatively, or additionally, it may be indicated in a scheduling grant which may schedule transmission and/or resource for the data channel.

The common resource structure or data channel resource or transmission may be scheduled, e.g. with a scheduling grant. In some cases, it may be configured, e.g. as configured grant and/or semi-static or semi-persistent resource. A DCI triggering the resource for transmission may include an indication of the scaling parameter/s. In some cases, the scaling parameter/s and/or associated table/s may be configured or configurable to the wireless device, e.g. using higher layer signaling like RRC and/or MAC signaling. In general, the common transmission resource may be available to the wireless device for transmission, e.g. triggered and/or scheduled and/or configured. Similarly, the first and/or second transmission resource may be considered available to the wireless device. In particular, one indicator in downlink control signaling may indicate the scaling parameter, for example by indicating or indexing a table entry or table entries in different tables and/or sub-tables.

It may in general be considered that a first transmission quality is associated to a higher priority than a second transmission quality, or vice versa. It may be considered that for higher priority, higher scaling parameters may be used than for lower priority, e.g. that for each entry in a table for a higher priority and/or transmission quality and/or for URLLC, the scaling parameter is larger than (and/or at least equal to) scaling parameter in the corresponding entry for a lower priority and/or transmission quality and/or for eMBB.

It may be considered that the first transmission quality may be associated to and/or represent URLLC transmission, and/or the second transmission quality may be associated to and/or represent eMBB transmission.

In some cases, the first control information may be mapped to the common transmission resource or data channel resource based on rate-matching. Alternatively, puncturing may be used. In some cases, whether puncturing or rate-matching is used for the first control information may be based on payload size, e.g. for the complete information or for a specific type like acknowledgement/HARQ or SR. It may be considered that rate-matching is used for the first control information.

A first control channel, for example a PUCCH or PSCCH, may be associated to a first transmission resource. Further alternatively or additionally, the common transmission resource may be associated to transmission on the data channel, e.g. a PUSCH or PSSCH or other physical data channel. The first control channel or triggered transmission of first control information may be associated to a first transmission quality and/or priority, e.g. by configuration and/or scheduling, and/or based on signaling characteristic/s. The first transmission quality and/or priority may be associated to, and/or represent, URLLC. The common transmission resource and/or transmission on a data channel may be associated to the first transmission quality and/or priority, or to a second transmission quality of priority, which may be lower or higher than the first transmission quality or priority. The second transmission quality or priority may in particular be lower than the first, and/or be associated to and/or represent eMBB communication or operation. In general, the common transmission resource or data channel may also carry data, e.g. of an uplink shared channel (UL-SCH), e.g. if the resource is large enough to allow multiplexing the control information and data. In general, the first transmission resource may at least partially overlap with the common transmission resource in time. However, cases in which they do not overlap may be considered.

In some cases, different transmission qualities may correspond to different service requirements and/or priorities. In particular, one of the transmissions and/or resource structures and/or information may be prioritised higher than the other. A transmission quality may generally indicate and/or be represented by a latency requirement. Different transmissions or different transmission qualities may have different latency requirements. A higher latency requirement in general may indicate a shorter time for transmission than a lower latency requirement. The approaches disclosed herein facilitate efficient use of resources while following latency requirements, e.g. in the context of URLLC. In some cases, higher priority does not coincide with higher latency requirement, e.g. due to configuration and/or service setup by an operator and/or according to a prioritisation representation and/or if a service requiring higher reliability is prioritised. In this case, it may still be useful to fulfil the higher latency requirements, and if multiplexing is not possible, to omit or shift the higher priority transmission.

In some cases, mapping or multiplexing of the first control information may be dependent on the common resource structure or data channel resource ending in time before or at the end of a predetermined time window, which may be a latency window. The end (in time domain) of the time window may be based on a latency requirement for the first information and/or first resource structure and/or the third information and/or third resource structure; higher latency may correspond to an earlier end of the latency window, e.g. based on the same reference.

A duration of a predetermined time window may be dependent on a transmission type and/or priority of the information blocks and/or associated to the resource structures. The duration may in particular be dependent on the latency requirement of the transmission or information or resource structure with the higher latency requirement.

A wireless device may be implemented as user equipment or terminal. The wireless device may comprise, and/or be implemented as, and/or be adapted to utilise, processing circuitry and/or radio circuitry, in particular a transceiver and/or transmitter and/or receiver, for transmitting signaling and/or control information and/or communication signaling and/or data signaling, and/or for receiving subject signaling and/or control signaling, e.g., the control information message.

A network node may be implemented as a radio network node, e.g. as gNB or IAB (Integrated Access and Backhaul) node or relay node or base station. In some cases, it may be implemented a wireless device or user equipment, e.g. in a sidelink scenario. The network node may comprise, and/or be implemented as, and/or be adapted to utilise, processing circuitry and/or radio circuitry, in particular a transceiver and/or transmitter and/or receiver, for transmitting a control information message and/or other control or data signaling and/or configuring and/or triggering a wireless device, and/or for receiving (e.g., communication or data or control) signaling. The wireless communication network may be a Radio Access Network (RAN), in particular a 5G RAN or NR RAN, or in some scenarios a sidelink or D2D (Device-to-Device) network or IAB network.

There is also considered a program product comprising instructions adapted for causing processing circuitry to control and/or perform a method as described herein. Moreover, a carrier medium arrangement carrying and/or storing a program product as described herein may be considered. A system comprising a network node and a UE as described herein is also described, as well as an associated information system.

BRIEF DESCRIPTION OF THE DRAWINGS

The drawings are provided to illustrate concepts and approaches described herein, and are not intended to limit their scope. The drawings comprise.

DETAILED DESCRIPTION

In the following, concepts and approaches are described in the context of NR technology. However, the concepts and approaches may be applied to other RATs. Moreover, the concepts and approaches are discussed in the context of communication between network node (gNB) and UE, for uplink transmission of communication signaling, but also may be applied to downlink transmission scenarios in some cases. They may be generally applied to a sidelink scenario, in which case both involved radio nodes may be UEs, or in a backhaul or relay scenario, in which cases both radio nodes may be network nodes.

Figure 1:
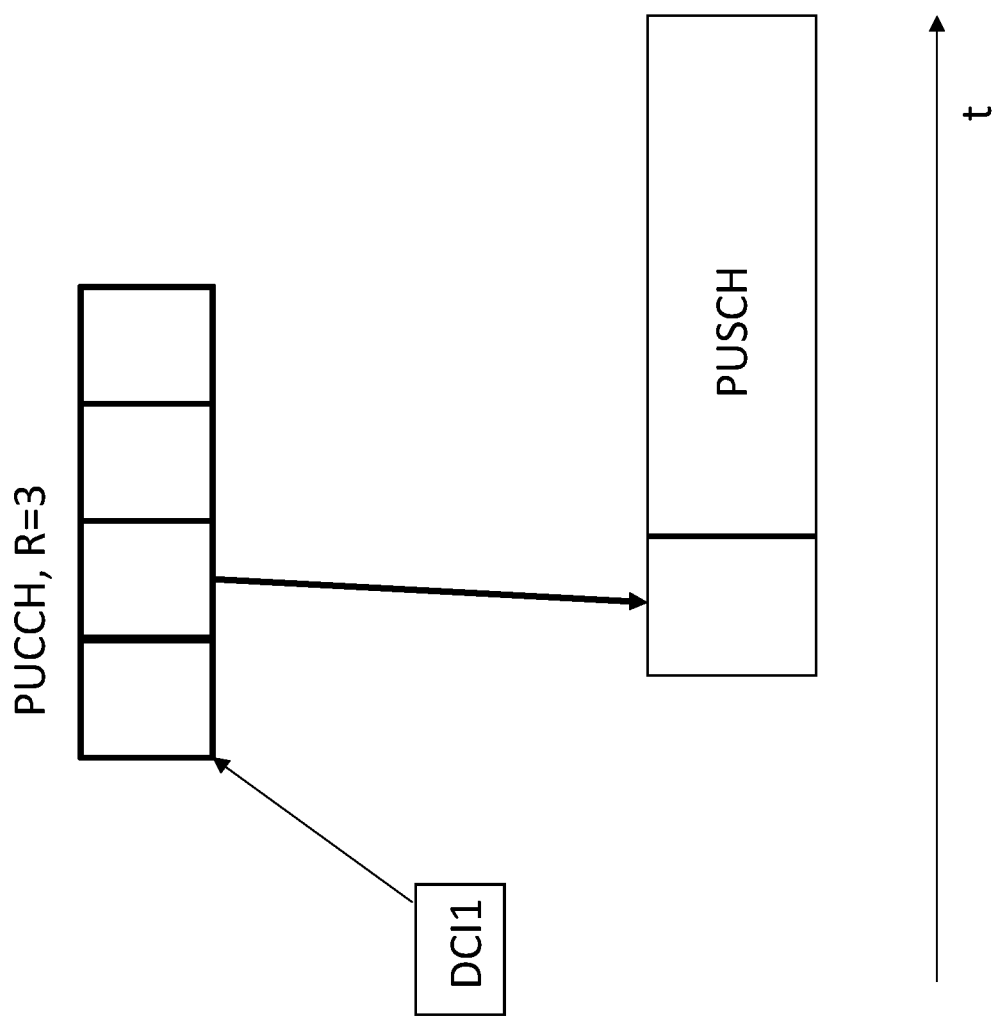
FIG. 1, showing an exemplary scenario for transmission of control signaling.

FIG. 1 shows an exemplary scenario for transmitting control information on a data channel like PUSCH. As can be seen, in a slot (or subslot), there is triggered a transmission on a control channel PUCCH, with a number of retransmissions being triggered (number of retransmissions R=3, 4 transmissions in total). A suitable PUCCH resource may be considered to be available, e.g. large enough to carry the retransmissions, and/or related to a series of PUCCH resource for carrying the retransmissions, e.g., in subsequent slots or subslots. The PUCCH transmission may be associated to a transmission quality and/or high priority, which may correspond to URLLC. Each transmission/retransmission pertains to the same payload, first control information. The retransmissions may be triggered to be on the same resource, or within the same slot, or distributed over several slots or subslots. The number of retransmission may be configured, e.g. with RRC signaling, and/or triggered with one DCI, e.g. a scheduling assignment or scheduling grant. In the same slot, there is a PUSCH transmission scheduled, respectively a PUSCH resource available, e.g. as scheduled or configured grant. The PUSCH resource may be considered as common transmission resource or common resource structure, onto which first control information may be mapped or multiplexed, e.g. together with data and/or in some cases second control information, e.g. associated to a triggered second control channel transmission and/or control channel resource. The first control information, instead of being transmitted on the PUCCH resource, is transmitted as "UCI on PUSCH" utilising the PUSCH resource available; if the size of the PUSCH resource is sufficient, data, if present, may be multiplexed with the control information. The first control information is mapped to the PUSCH resource based on a scaling parameter, which indicated how many resource elements and/or modulation symbols associated to the PUSCH resource are to be used for the transmission of control information. The code rate and/or number of coding bits may be associated to the number of resource elements/modulation symbols, and thus to the scaling parameter. The scaling parameter is based on the number of retransmissions indicated for the PUCCH transmission. The line within the PUSCH field indicates in this example the resource region used for the control information. With a suitably large scaling parameter, sufficient coding bits and/or repetitions may be provided to allow a reliability comparable to the reliability level provided by retransmissions on PUCCH, e.g. in terms of BLER and/or BER. It should be noted that the coding may be polar coding, or LDPC or other systematic coding. The number of bits for coding (in particular FEC like polar coding) based on the scaling parameter may be large than the number of information bits of the control information (payload), and/or may lead to repetitions of coded bits. However, the number of repetitions Rd of control information (information or payload bits, e.g. without error detection coding bits and/or without FEC bits) may be different from the number R. In some cases, the transmission of first control information may be split and/or repeated over two or more data channel resources, e.g. a scheduled resource and a configured resource.

A transmission quality may indicate and/or represent and/or correspond to and/or be associated to one or more transmission parameters regarding and/or pertaining to communication quality or quality requirement/s and/or target/s, in particular regarding a transmission error rate like BLER and/or BER and/or a latency and/or a type of transmission or transmission mode (e.g., URLLC or eMBB) and/or priority and/or quality of service. A transmission quality may be associated to and/or pertain to an operation mode and/or one or more channel, in particular physical channel/s and/or logical channel/s or logical channel group. Several (physical and/or logical) channels may be associated a transmission quality and/or transmission mode or operation mode, in particular control channels like PUCCH and/or PDCCH and data channels like PUSCH and/or PDSCH. The control channels may pertain to the associated data channels, e.g. for controlling communication of data via these data channels. It may be considered that different operation modes (e.g., URLLC and eMBB) are operated at the same time pertaining to the same wireless device. Transmission quality may be represented in a priority representation.

A transmission quality may be indicated explicitly and/or implicitly. Transmission quality may be explicitly indicated with control signaling, e.g. a downlink control information message and/or configured, e.g. with higher-layer signaling like MAC signaling and/or RRC signaling. In some cases, a DCI message, e.g. a scheduling grant, may indicate and/or point and/or index to a configured or predefined transmission quality, which for example may be one of a set and/or correspond to a table entry. A transmission quality may for example be implicitly indicated based on a characteristic of a control information message, e.g. a DCI message format (e.g., DCI format 0_n, e.g. 0_0 or 0_1, in an NR system) and/or resource or resource structure (e.g., indicated or allocated by a DCI message, or configured for a transmission quality) and/or an identity indicated in a DCI message (e.g., a RNTI, which may be used for scrambling the DCI message and/or an associated error coding like a CRC). A wireless device may be configured with different RNTIs for URLLC and/or eMBB or other operation modes.

A predetermined time window (or latency window) may represent a (target or required, for example) maximum time after a triggering event or time (e.g., start or end of a received DCI or PDSCH transmission) a transmission has to occur to fulfil a latency requirement. The time window may also be referred to as latency time window. The window may represent the latency requirement of the transmission with the higher latency, and/or, in some cases, the latency requirement for the transmission for which the latency requirement demands an earlier transmission. The predetermined time window may start at the beginning or end of a received transmission (also referred to as reference signaling or reference transmission), e.g. a scheduling DCI or a subject transmission, for example a data transmission like a PDSCH transmission for which HARQ feedback transmission is triggered, or a control information transmission like a PDCCH transmission (e.g., DCI) scheduling the PDSCH transmission. Thus, the window may be adapted to a triggering transmission, relative to which the time window (which may be referred to as latency window) and/or its end in time domain may be arranged or determined. A time window being pre-determined may correspond to the size or duration of the time window being predetermined, e.g. configured or configurable or predefined, whereas its exact location (e.g., start) may depend on a triggering event like the reference signaling or transmission.

A resource structure may represent time/frequency resources and may optionally also comprise code resource/s. A resource structure may also be referred to as resource or transmission resource. A resource structure may be scheduled, e.g. with dynamic scheduling, in particular for transmission on a data channel, for example with a DCI message like a scheduling grant and/or a DCI format 0_n (e.g., 0_0 or 0_1) for NR. In some cases, a resource structure may be configured, e.g. a configured grant for uplink transmission (by a wireless device) on a data channel like PUSCH. A resource structure pertaining to a control channel like PUCCH or another physical channel for control may for example be configured by higher layer signaling, e.g. with RRC and/or MAC signaling. A resource structure for a control channel may for example be configured as part of a pool or a set. Multiple sets may be configured, e.g. for different payloads and/or different formats for PUCCH transmission and/or different types of control information to be transmitted. A resource may represent a resource structure and/or comprise for example time and/or frequency and/or code resources (e.g., an orthogonal cover code or spreading code). A resource or resource structure may cover one or more symbols or symbol time intervals (e.g., continuously or neighboring symbols) in time domain, and/or one or more subcarrier or physical resource blocks or physical resource block groups in frequency domain (e.g., continuously or non-continuously). Resources or resource structures may be considered to at least partly or partially overlap in time or time domain, if they comprise a common time interval, e.g. at least one symbol is common to the overlapping resources, for example at least the ending symbol of one resource and the starting symbol of the other resource. At least partially or partly overlapping may be considered to comprise total overlap, e.g. if their time domain extension is identical (e.g., covering the same symbols and the same number of symbols), or if one is embedded into the other, e.g. such that one resource covers at least all the symbols covered by the other resource (it may cover more symbols, e.g. starting earlier and/or ending later). Overlapping resources (in time domain) may in some variants be in the same slot, or in some cases in the same subslot. It may generally be assumed that (different) transmissions of control information may be triggered, e.g. such that multiple PUCCH transmission are triggered or scheduled and/or available or valid (e.g., 2 or more), in a slot or subslot, for example if different transmissions are for different types of control information, in particular for different simple types. For resources overlapping in frequency domain, analogous wording may be used. In general, resources or resource structures at least partly or partially overlapping in time domain may or may not be at least partly overlapping in frequency domain. An allocated resource structure may be a scheduled resource structure, or a configured resource structure.

A transmission on or utilising a resource or resource structure may be considered triggered if it is scheduled dynamically, e.g. with a scheduling grant, or a configured resource being indicated for transmission, e.g., explicitly or implicitly by a control information message like a DCI message. Alternatively, or additionally, a transmission may be considered triggered by a higher layer (e.g., of the transmitting device, in particular the wireless device), e.g., by providing data for transmission, e.g. for a scheduled PUSCH resource or to be used for a configured grant. A triggered transmission may pertain to an available resource, and/or a triggered resource may be an available resource (available to the wireless device, in particular). It should be noted that a triggered transmission does not necessarily have to be transmitted, or may be transmitted on another resource structure than the one triggered. A triggered transmission may represent an intended transmission. Transmitting signaling based on multiplexing information may comprise, and/or represent, transmitting multiplexed information and/or signaling representing multiplexed information.

A common resource structure may be a resource structure used or suitable for multiplexing and/or carrying different transmissions and/or information and/or information blocks, and/or corresponding signaling. A common resource structure may be a scheduled or configured resource. In some cases, a common resource structure may be a resource structure from a pool or set or sets of configured resources, in particular PUCCH resources. A common resource structure may be indicated in a control information message, or be determined or selected based on which transmissions are triggered. It may be considered that a common resource structure may be a resource structure from a configured set to which an indicated PUCCH resource belongs. In some cases, it may be from a different set of configured PUCCH resources. A common resource structure may generally be a resource structure that is large enough (e.g., in terms of resource elements and/or associated transmission parameters, e.g. MCS) that it can carry the (multiplexed) transmission. Transmission on a common resource structure may comply with the transmission quality of one of the multiplexed transmissions, in particular the one of the higher prioritised transmission (e.g., regarding coding or code rate or MCS or power), or a mixture of the multiplexed transmissions, e.g. such that part follows the higher (e.g., regarding coding) and another part the other. A common resource structure may be a resource structure for which transmission is triggered (e.g., if the resource is large enough to carry multiplexed information), or it may be a different one. In general, a common resource structure may have an end symbol or end in time that is within a time domain window (latency window), e.g. ends before or at the end of the time domain window (e.g., both have the same ending symbol, or the ending symbol of the common resource structure ends before or at the end of the window). A common resource structure may be an available or allocated resource structure, for example a scheduled resource structure or configured resource structure.

Control information transmitted by a wireless device may be uplink control information, UCI, and/or physical layer information. Control information, in particular UCI, may be one of different types. Example types of control information like UCI may comprise (as simple types) HARQ feedback, measurement information (e.g., CSI type I or II), a scheduling request (e.g., single bit request, or multiple bit request, or buffer report), or beam tracking information. Measurement information may be typed in aperiodic (e.g., triggered by dynamic scheduling) and periodic (e.g., configured to regularly appear). Any two or more of such types may be combined to provide a new (combined) type of control information, e.g. HARQ feedback with SR and/or measurement information, etc.

A control information message may be a physical layer message, e.g. a DCI message or scheduling grant (e.g., format 0, 0_n, e.g. 0_0 or 0_1 for NR) or scheduling assignment (e.g., format 1, 1_m, e.g. 1_0 or 1_1 for NR). The control information message may be considered to represent control signaling.

Transmitting first information and second information (or different information pieces or information blocks) on or utilising one resource structure or resource may comprise and/or represent multiplexing. Multiplexing different information or information blocks may comprise error encoding the information blocks jointly or separately. In some cases, error detection coding may be performed separately on different information blocks, but error correction coding like polar coding or LPDC may be performed on the error detection coded blocks jointly. Multiplexing may comprise rate-matching and/or puncturing, in particular for multiplexing control information (associated to PUSCH) onto a resource structure for PUSCH. In rate-matching, information bits (and optionally error detection bits, e.g. CRC bits or parity bits) from the information to be multiplexed may be added to information bits (and optionally error detection bits, e.g. CRC bits or parity bits) before coding, in particular before error correction coding. The total number of coding bits (e.g., for error correction coding) may be adapted to allow for the additional information and/or bits from the information bits multiplexed on may be dropped. Puncturing may correspond to replacing encoded modulation symbols of the transmission or information multiplexed on by modulation symbols for the multiplexed information or transmission. Different types of information, in particular control information, may be multiplexed similarly, or differently, e.g. depending on payload size. The resources available for multiplexing information onto a resource (which may be intended to carry other information), in particular in case of multiplexing UCI/PUCCH information on PUSCH resources or to information on PUSCH, may be indicated and/or based on a scaling parameter (also referred to as beta-factor). Different types of control information may have different betas associated to them, e.g. based on configuration. Beta may be considered to indicate the resource elements available for UCI, and in relation to other parameters, e.g. number of bits to multiplex or map and/or MCS to be used and/or type/s of control information, may indicate the code rate and/or coding, e.g. the number of coding bits available.

In cases described herein, if no multiplexing is performed, one of the transmissions (e.g., the one with lower priority/transmission quality) or information or information blocks may be discarded or omitted, or shifted in time, e.g. to a later transmission occasion (e.g., suitable resource), e.g. in a later slot or subslot. Other information may be transmitted on the triggered or scheduled resources.

Information or an information block may in general represent information or data or bits intended for transmission, e.g. provided by a higher layer of the transmitting device. Information, in particular an information block, may be provided in and/or arranged in and/or comprise and/or represent and/or consist of and/or correspond to a data element, e.g. a transport block and/or data unit (e.g., Packet Data Unit, PDU, in particular a MAC PDU or higher layer PDU). Different information may come from different higher-layer units (e.g., MAC entities) and/or may be associated to different channels (e.g., physical or logical, for example PUCCH and PUSCH) and/or bearers and/or channel groups (e.g., logical channel groups) and/or operation modes (e.g., URLLC and eMBB). An information block may be represented by a corresponding information representation, which may represent the bits of the information block, e.g. based on scrambling and/or modulation and/or mapping and/or coding and/or compression or decompression. An information block may comprise and/or represent higher layer information.

A transmission quality and/or a resource structure may have associated to it (e.g., via configuration and/or pre-defined and/or dynamically scheduled) one or more transmission parameters, for example pertaining to a modulation and coding scheme (MCS), number of retransmissions or number of transmissions in an aggregation and/or in parallel (e.g., for one triggering occurrence), number of layers, transmission power, coding bits to be used (e.g., for error detection and/or error correction), etc. A parameter may define a boundary (e.g., lower boundary for power, or higher boundary for the modulation scheme) or an actual value (e.g., target or nominal value).

A resource like a resource structure or communication resource (e.g., transmission resource or reception resource) may be considered available to the wireless device, if the wireless device is aware or has been made aware of the resource as potentially useable by it for transmission or reception or communication, e.g. when it is or may be allowed or configured or scheduled to use it. A resource may be configured to the wireless device, e.g. with higher layer signaling like RRC signaling or MAC signaling or broadcast signaling, to be available. A resource may be associated (e.g., by scheduling or configuration) to a type of signaling or channel, e.g. to control signaling or data signaling, and/or to PUCCH or SR or PUSCH. Examples of such may for example be configured resources for control signaling, e.g. a scheduling request, or a configured resource for data signaling (sometimes also referred to as grant-free resource, in particular for uplink), e.g. on PUSCH or PDSCH. A configured resource for data signaling may be triggered on or off, e.g. with control signaling, e.g. DCI signaling and/or the control information message. Such resources may be generally referred to as configured resources and/or be considered to be semi-static (e.g., until reconfigured with higher-layer signaling) or semi-persistent resources (e.g., triggered with control signaling). In some cases, a configured resource may be a resource that is available without needing activation or triggering or scheduling with a control information message, or a semi-persistent resource. Configured resources may in some cases be considered to be available over a long and/or undetermined (e.g., at the time of configuration or scheduling or allocation) timeframe or time interval, e.g. longer than one slot, or longer than M slots (M>1 and/or configurable), and/or until a change in setup occurs or a specific event occurs, e.g. reconfiguration (on higher-layer, e.g. RRC or MAC) or triggered off (e.g., with control signaling like DCI or SCI, in particular for semi-persistent). A CORESET for reception of control signaling like PDCCH signaling or DCI signaling (or a search space for control signaling) may be considered a configured resource in some examples. Alternatively, a resource available to a wireless device may a resource scheduled or allocated with control signaling, in particular physical layer signaling like DCI signaling, e.g. the control information message. Such resources may be referred to as (dynamically) scheduled resources. Scheduled resources may for example comprise dynamically scheduled resources for data signaling, e.g. on PUSCH or PDSCH (for example, according to Type A or Type B scheduling in NR), or resources for control signaling indicated in control signaling, e.g. DCI or SCI, for example PUCCH resources (e.g., one of a set or pool of resources indicated in the signaling, e.g. a PRI, PUCCH resource indicator). In some cases, scheduled resources may generally be considered resources available or valid for a short (e.g., one slot or several slots, e.g. 16 or fewer slots, or 1 frame) or specific or determined (e.g., at the time of scheduling or allocation) time frame or time interval or duration, e.g. a slot (or more than one slot, e.g. for scheduled aggregation). A resource or resource structure available or scheduled for transmission may be considered a transmission resource or transmission resource structure. In general, transmission utilising a resource or resource structure may cover the resource structure partly or fully, e.g. using only a part or all of the resource elements of the resource structure. It may be generally considered that a resource structure may be logically addressable by control signaling as a unit, and/or may be configured jointly or as a unit, and/or represent neighbouring and/or consecutive resource elements (e.g., in time and/or frequency space, and/or physically or virtually, e.g. if virtual resource allocation is utilised).

Receiving a data channel and/or on a common resource structure may comprise monitoring the resource structure and/or associating signaling received thereon with a transmitting device and/or channel and/or operation mode. Receiving may comprise modulating and/or decoding, e.g. based on information regarding the (assumed) transmitter, for example the configuration of this transmitter.

Communication signaling may be data signaling or control signaling (or comprise both in some cases, e.g. if control and data signaling are multiplexed, for example if UCI is multiplexed on PUSCH). Communication signaling may be of different types and/or priority, e.g. associated to URLLC or eMBB, or associated to logical channel groups. In general, to different resources there may be associated the same type of signaling, or different types of signaling, e.g. types of control signaling (e.g., URLLC or eMBB, and/or HARQ feedback or SR) or data signaling (e.g., URLLC or eMBB).

Control signaling may carry and/or represent and/or comprise control information, which may be in a control information message. Control information like UCI may generally comprise one or more types of control information, which types may comprise HARQ feedback and/or measurement report information and/or scheduling request and/or beam-related information. Control information like DCI may comprise for example scheduling information or allocation information (e.g., indicating resource allocation) and/or HARQ process information and/or power control information (e.g., Transmit Power Control command), and/or information indicating a bandwidth part to use, etc. The structure (e.g., bit fields) of a control information message may be predefined, e.g. based on the format (e.g., DCI 0_0 or 1_0 for NR), or configured or configurable (e.g., DCI 0_1 or 1_1 for NR).

It may be considered that a or each resource is associated to a specific type of signaling or type of transmission or priority, e.g. by configuration or other association. For example, a resource (e.g., first transmission resource) for PUSCH or PUCCH may be associated to URLLC operation, which might have a higher priority than eMBB, to which the second transmission resource may be associated. By indicating which resource is to be used, the associated signaling and/or priority may be indicated. A first transmission/communication/reception resource may also be referred to as first resource, a second transmission/communication/reception resource may be referred to as second resource. Different resource may differ in extension in time domain and/or frequency domain and/or code and/or associated channel and/or type of signaling and/or format of transmission (e.g., PUCCH/UCI format or DCI/PDCCH format). In general, different types of signaling may differ regarding control or data signaling, and/or types of control signaling (e.g., content, like SR or HARQ feedback or measurement report) and/or format of transmission. Type of signaling or transmission format may be associated to a resource, e.g. according to configuration. For example, to a PUCCH resource or resource set, one or more possible PUCCH formats may be configured. In general, which PUCCH resource to use out of a set, may be associated to a payload size of information to be transmitted. Thus, a resource (e.g., first or second resource) may be dependent on payload size if control signaling is to be transmitted.

A priority or type of transmission or transmission quality may be associated to and/or determined based on a signaling characteristic of a control information message. The signaling characteristic may comprise one or more characteristics. Example characteristics may comprise message format (e.g., 0_1, 0_0, 1_0 1_1, 0_n or 0_m or similar), message size (e.g., in bits and/or resource elements) and/or aggregation level (e.g., how over it is repeated) and/or resources in which it is received (e.g., CORESET and/or search space) and/or an identity or addressee of the message, e.g. indicated by an identifier like a scrambling code (e.g., RNTI, with which error detection coding or CRC associated to the message may be scrambled to identify an addressee). For example, an URLLC RNTI may be used to identify that an associated resource is to be used, or an eMBB RNTI analogously. Different formats and/or characteristics may be associated to different resources (e.g., on a one-to-one basis), such that the format or resource or RNTI may indicate which resource to use.

Alternatively, or additionally, a transmission type or priority or transmission quality may be based on the content of the control information message, e.g. a bit pattern of a bit field in the control information message and/or an indicator in the control information message, which may represent a priority indicator. The bit field may comprise one or more bits, e.g. one of one, two or three bits.

In some cases, a resource structure like a first resource structure and/or a second resource structure may be considered scheduled for transmission and/or available to the wireless device by being scheduled or dynamically scheduled to the wireless device, e.g. with the control information message, and/or may be a scheduled resource. It may be considered that a resource structure like a first resource structure and/or a second resource structure may be available and/or scheduled to the wireless device by being configured to the wireless device and/or is a configured resource. A configured resource may be associated to data signaling, or to control signaling, in particular to SR signaling.

In some variants, a first resource structure may be a scheduled resource, and a second resource structure may be a configured resource, or vice versa. A control information message may indicate the prioritised one of the resources, e.g. the configured resource if it is a grant-free resource for transmitting data signaling, or the schedule resource, e.g. if the scheduled resource starts or ends earlier than the configured resource, e.g. to lower latency. However, other use cases may be considered. In some cases, both first resource structure and second resource structure may be scheduled, or configured.

Communication signaling may in general comprise control signaling and/or data signaling. The type of signaling may be indicated with a control information message, e.g. indicated by its type and/or content and/or format, and/or may be associated to the resource determined as communication/transmission resource. Accordingly, the approaches may be applied to a wide variety of use cases.

In particular, it may be considered that the information or type of signaling transmitted with the communication signaling is dependent on the transmission resource and/or the received control information message. The information may be associated to control plane or user plane, and/or a (e.g., physical) channel, and/or to a type of signaling, and/or format of transmission, and/or a logical channel or logical channel group and/or priority or priority level, e.g. based on the resource it is associated to and/or a configuration. It may be considered that with the control information message, a priority configuration may be overridden, e.g. such that a resource configured (at a higher layer) to be associated to a lower priority level may be prioritised over a resource of a higher priority level. Thus, dynamic re-prioritisation or overriding of prioritisation is possible.

It may be considered that the first transmission resource is associated to transmission of control information and/or the second transmission resource is associated to transmission of control information. The resources may be associated to different types of control information.

In general, a first transmission resource and a second transmission resource may be associated to different types of signaling and/or different types of control signaling or data signaling and/or transmission quality or priority (in particular, regarding priority or quality of service, e.g. URLLC or eMBB).

It may be considered that a control information message (e.g., DCI message) indicates a prioritisation of the first transmission resource relative to the second transmission resource, which may for example override a higher-level prioritisation, e.g. a configured priority and/or quality of service priority (e.g., URLLC or eMBB).

Figure 2:
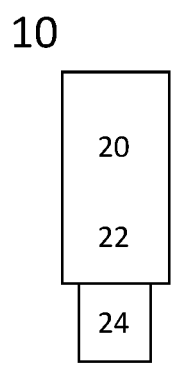
FIG. 2, showing an example of a radio node implemented as a terminal or UE.

FIG. 2 schematically shows a radio node or wireless device, in particular a terminal 10 or a UE (User Equipment). Radio node 10 comprises processing circuitry (which may also be referred to as control circuitry) 20, which may comprise a controller connected to a memory. Any module of the radio node 10, e.g. a communicating module or determining module, may be implemented in and/or executable by, the processing circuitry 20, in particular as module in the controller. Radio node 10 also comprises radio circuitry 22 providing receiving and transmitting or transceiving functionality (e.g., one or more transmitters and/or receivers and/or transceivers), the radio circuitry 22 being connected or connectable to the processing circuitry. An antenna circuitry 24 of the radio node 10 is connected or connectable to the radio circuitry 22 to collect or send and/or amplify signals. Radio circuitry 22 and the processing circuitry 20 controlling it are configured for cellular communication with a network, e.g. a RAN as described herein, and/or for sidelink communication. Radio node 10 may generally be adapted to carry out any of the methods of operating a radio node like terminal or UE disclosed herein; in particular, it may comprise corresponding circuitry, e.g. processing circuitry, and/or modules, e.g. software modules. It may be considered that the radio node 10 comprises, and/or is connected or connectable, to a power supply.

Figure 3:
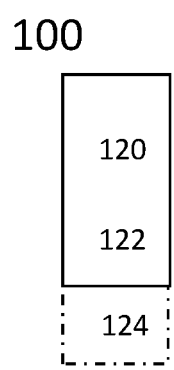
FIG. 3, showing an example of a radio node implemented as a network node, in particular a gNB.

FIG. 3 schematically shows a radio node 100, which may in particular be implemented as a network node 100, for example an eNB or gNB or similar for NR. Radio node 100 comprises processing circuitry (which may also be referred to as control circuitry) 120, which may comprise a controller connected to a memory. Any module, e.g. transmitting module and/or receiving module and/or configuring module of the node 100 may be implemented in and/or executable by the processing circuitry 120. The processing circuitry 120 is connected to control radio circuitry 122 of the node 100, which provides receiver and transmitter and/or transceiver functionality (e.g., comprising one or more transmitters and/or receivers and/or transceivers). An antenna circuitry 124 may be connected or connectable to radio circuitry 122 for signal reception or transmittance and/or amplification. Node 100 may be adapted to carry out any of the methods for operating a radio node or network node disclosed herein; in particular, it may comprise corresponding circuitry, e.g. processing circuitry, and/or modules. The antenna circuitry 124 may be connected to and/or comprise an antenna array. The node 100, respectively its circuitry, may be adapted to perform any of the methods of operating a network node or a radio node as described herein; in particular, it may comprise corresponding circuitry, e.g. processing circuitry, and/or modules. The radio node 100 may generally comprise communication circuitry, e.g. for communication with another network node, like a radio node, and/or with a core network and/or an internet or local net, in particular with an information system, which may provide information and/or data to be transmitted to a user equipment.

Allocated or scheduled resources may be allocated dynamically, e.g. with a scheduling grant and/or DCI signaling, e.g. DCI format 0_0 or 0_1 message (or, if Downlink resources, with a scheduling assignment, e.g. a DCI format 1_0 or 1_1 message), or allocated semi-statically, e.g. with a configured grant and/or RRC signaling. The allocated resources may represent a block of resource elements in time/frequency domain, which may be contiguous in time and/or frequency, e.g. for a physical allocation or a virtual allocation. The resources may be allocated for a data channel, in particular a PUSCH or PSSCH, e.g. based on the format and/or parametrisation of DCI message used for allocation, or the RRC parametrisation used for a configured grant. In general, a scheduling assignment may schedule subject signaling (e.g., data signaling on PDSCH) to which the acknowledgement signaling or part of it pertains, and may also indicate in which slot the acknowledgement information/signaling is expected. A grant may indicate allocated resources (in particular, for PUSCH) on which uplink transmission may occur. If these allocated resources are in a slot indicated for acknowledgment signaling, the acknowledgment signaling may be transmitted using the allocated resources instead of resources allocated for control signaling, e.g. PUCCH resources ("UCI on PUSCH" or "HARQ on PUSCH").

Allocated resources may be resources allocated for, a Physical Uplink Shared Channel, PUSCH, or a Physical Downlink Channel, PDSCH, or a control channel, e.g. PUCCH. The resources may in particular be time/frequency resources, e.g. one or more PRBs or PRB groups on one or more symbols of a slot. The allocated resources may correspond to slot-based allocation (Type A) or mini-slot based allocation (Type B).

Transmitting acknowledgement signaling may in general be based on and/or in response to subject transmission, and/or to control signaling scheduling subject transmission. Such control signaling and/or subject signaling may be transmitted by a signaling radio node (which may be a network node, and/or a node associated to it, e.g. in a dual connectivity scenario. Subject transmission and/or subject signaling may be transmission or signaling to which ACK/NACK or acknowledgement information pertains, e.g. indicating correct or incorrect reception and/or decoding of the subject transmission or signaling. Subject signaling or transmission may in particular comprise and/or be represented by data signaling, e.g. on a PDSCH or PSSCH, or some forms of control signaling, e.g. on a PDCCH or PSSCH, for example for specific formats.

A signaling characteristic may be based on a type or format of a scheduling grant and/or scheduling assignment, and/or type of allocation, and/or timing of acknowledgement signaling and/or the scheduling grant and/or scheduling assignment, and/or resources associated to acknowledgement signaling and/or the scheduling grant and/or scheduling assignment. For example, if a specific format for a scheduling grant (scheduling or allocating the allocated resources) or scheduling assignment (scheduling the subject transmission for acknowledgement signaling) is used or detected, the first or second communication resource may be used. Type of allocation may pertain to dynamic allocation (e.g., using DCI/PDCCH) or semi-static allocation (e.g., for a configured grant). Timing of acknowledgement signaling may pertain to a slot and/or symbol/s the signaling is to be transmitted. Resources used for acknowledgement signaling may pertain to the allocated resources. Timing and/or resources associated to a scheduling grant or assignment may represent a search space or CORESET (a set of resources configured for reception of PDCCH transmissions) in which the grant or assignment is received. Thus, which transmission resource to be used may be based on implicit conditions, requiring low signaling overhead.

Scheduling may comprise indicating, e.g. with control signaling like DCI or SCI signaling and/or signaling on a control channel like PDCCH or PSCCH, one or more scheduling opportunities of a configuration intended to carry data signaling or subject signaling. The configuration may be represented or representable by, and/or correspond to, a table. A scheduling assignment may for example point to an opportunity of the reception allocation configuration, e.g. indexing a table of scheduling opportunities. In some cases, a reception allocation configuration may comprise 15 or 16 scheduling opportunities. The configuration may in particular represent allocation in time. It may be considered that the reception allocation configuration pertains to data signaling, in particular on a physical data channel like PDSCH or PSSCH. In general, the reception allocation configuration may pertain to downlink signaling, or in some scenarios to sidelink signaling. Control signaling scheduling subject transmission like data signaling may point and/or index and/or refer to and/or indicate a scheduling opportunity of the reception allocation configuration. It may be considered that the reception allocation configuration is configured or configurable with higher-layer signaling, e.g. RRC or MAC layer signaling. The reception allocation configuration may be applied and/or applicable and/or valid for a plurality of transmission timing intervals, e.g. such that for each interval, one or more opportunities may be indicated or allocated for data signaling. These approaches allow efficient and flexible scheduling, which may be semi-static, but may updated or reconfigured on useful timescales in response to changes of operation conditions.

Control information, e.g., in a control information message, in this context may in particular be implemented as and/or represented by a scheduling assignment, which may indicate subject transmission for feedback (transmission of acknowledgement signaling), and/or reporting timing and/or frequency resources and/or code resources. Reporting timing may indicate a timing for scheduled acknowledgement signaling, e.g. slot and/or symbol and/or resource set. Control information may be carried by control signaling.

Subject transmissions may comprise one or more individual transmissions. Scheduling assignments may comprise one or more scheduling assignments. It should generally be noted that in a distributed system, subject transmissions, configuration and/or scheduling may be provided by different nodes or devices or transmission points. Different subject transmissions may be on the same carrier or different carriers (e.g., in a carrier aggregation), and/or same or different bandwidth parts, and/or on the same or different layers or beams, e.g. in a MIMO scenario, and/or to same or different ports. Generally, subject transmissions may pertain to different HARQ processes (or different sub-processes, e.g. in MIMO with different beams/layers associated to the same process identifier, but different sub-process-identifiers like swap bits). A scheduling assignment and/or a HARQ codebook may indicate a target HARQ structure. A target HARQ structure may for example indicate an intended HARQ response to a subject transmission, e.g. the number of bits and/or whether to provide code block group level response or not. However, it should be noted that the actual structure used may differ from the target structure, e.g. due to the total size of target structures for a subpattern being larger than the predetermined size.

Transmitting acknowledgement signaling, also referred to as transmitting acknowledgement information or feedback information or simply as HARQ feedback or feedback or reporting feedback, may comprise, and/or be based on determining correct or incorrect reception of subject transmission/s, e.g. based on error coding and/or based on scheduling assignment/s scheduling the subject transmissions. Transmitting acknowledgement information may be based on, and/or comprise, a structure for acknowledgement information to transmit, e.g. the structure of one or more subpatterns, e.g. based on which subject transmission is scheduled for an associated subdivision. Transmitting acknowledgement information may comprise transmitting corresponding signaling, e.g. at one instance and/or in one message and/or one channel, in particular a physical channel, which may be a control channel. In some cases, the channel may be a shared channel or data channel, e.g. utilising rate-matching of the acknowledgment information. The acknowledgement information may generally pertain to a plurality of subject transmissions, which may be on different channels and/or carriers, and/or may comprise data signaling and/or control signaling. The acknowledgment information may be based on a codebook, which may be based on one or more size indications and/or assignment indications (representing HARQ structures), which may be received with a plurality of control signalings and/or control messages, e.g. in the same or different transmission timing structures, and/or in the same or different (target) sets of resources. Transmitting acknowledgement information may comprise determining the codebook, e.g. based on control information in one or more control information messages and/or a configuration. A codebook may pertain to transmitting acknowledgement information at a single and/or specific instant, e.g. a single PUCCH or PUSCH transmission, and/or in one message or with jointly encoded and/or modulated acknowledgement information. Generally, acknowledgment information may be transmitted together with other control information, e.g. a scheduling request and/or measurement information.

Acknowledgement signaling may in some cases comprise, next to acknowledgement information, other information, e.g. control information, in particular, uplink or sidelink control information, like a scheduling request and/or measurement information, or similar, and/or error detection and/or correction information, respectively associated bits. The payload size of acknowledgement signaling may represent the number of bits of acknowledgement information, and/or in some cases the total number of bits carried by the acknowledgement signaling, and/or the number of resource elements needed.

Subject transmission may be data signaling or control signaling. The transmission may be on a shared or dedicated channel. Data signaling may be on a data channel, for example on a PDSCH or PSSCH, or on a dedicated data channel, e.g. for low latency and/or high reliability, e.g. a URLLC channel. Control signaling may be on a control channel, for example on a common control channel or a PDCCH or PSCCH, and/or comprise one or more DCI messages or SCI messages. In some cases, the subject transmission may comprise, or represent, reference signaling. For example, it may comprise DM-RS and/or pilot signaling and/or discovery signaling and/or sounding signaling and/or phase tracking signaling and/or cell-specific reference signaling and/or user-specific signaling, in particular CSI-RS. A subject transmission may pertain to one scheduling assignment and/or one acknowledgement signaling process (e.g., according to identifier or subidentifier), and/or one subdivision. In some cases, a subject transmission may cross the borders of subdivisions in time, e.g. due to being scheduled to start in one subdivision and extending into another, or even crossing over more than one subdivision. In this case, it may be considered that the subject transmission is associated to the subdivision it ends in.

It may be considered that transmitting acknowledgement information, in particular of acknowledgement information, is based on determining whether the subject transmission/s has or have been received correctly, e.g. based on error coding and/or reception quality. Reception quality may for example be based on a determined signal quality. Acknowledgement information may generally be transmitted to a signaling radio node and/or node arrangement and/or to a network and/or network node.

Acknowledgement information, or bit/s of a subpattern structure of such information (e.g., an acknowledgement information structure, may represent and/or comprise one or more bits, in particular a pattern of bits. Multiple bits pertaining to a data structure or substructure or message like a control message may be considered a subpattern. The structure or arrangement of acknowledgement information may indicate the order, and/or meaning, and/or mapping, and/or pattern of bits (or subpatterns of bits) of the information. The structure or mapping may in particular indicate one or more data block structures, e.g. code blocks and/or code block groups and/or transport blocks and/or messages, e.g. command messages, the acknowledgement information pertains to, and/or which bits or subpattern of bits are associated to which data block structure. In some cases, the mapping may pertain to one or more acknowledgement signaling processes, e.g. processes with different identifiers, and/or one or more different data streams. The configuration or structure or codebook may indicate to which process/es and/or data stream/s the information pertains. Generally, the acknowledgement information may comprise one or more subpatterns, each of which may pertain to a data block structure, e.g. a code block or code block group or transport block. A subpattern may be arranged to indicate acknowledgement or non-acknowledgement, or another retransmission state like non-scheduling or non-reception, of the associated data block structure. It may be considered that a subpattern comprises one bit, or in some cases more than one bit. It should be noted that acknowledgement information may be subjected to significant processing before being transmitted with acknowledgement signaling. Different configurations may indicate different sizes and/or mapping and/or structures and/or pattern.

An acknowledgment signaling process (providing acknowledgment information) may be a HARQ process, and/or be identified by a process identifier, e.g. a HARQ process identifier or subidentifier. Acknowledgement signaling and/or associated acknowledgement information may be referred to as feedback or acknowledgement feedback. It should be noted that data blocks or structures to which subpatterns may pertain may be intended to carry data (e.g., information and/or systemic and/or coding bits). However, depending on transmission conditions, such data may be received or not received (or not received correctly), which may be indicated correspondingly in the feedback. In some cases, a subpattern of acknowledgement signaling may comprise padding bits, e.g. if the acknowledgement information for a data block requires fewer bits than indicated as size of the subpattern. Such may for example happen if the size is indicated by a unit size larger than required for the feedback.

Acknowledgment information may generally indicate at least ACK or NACK, e.g. pertaining to an acknowledgment signaling process, or an element of a data block structure like a data block, subblock group or subblock, or a message, in particular a control message. Generally, to an acknowledgment signaling process there may be associated one specific subpattern and/or a data block structure, for which acknowledgment information may be provided. Acknowledgement information may comprise a plurality of pieces of information, represented in a plurality of HARQ structures.

An acknowledgment signaling process may determine correct or incorrect reception, and/or corresponding acknowledgement information, of a data block like a transport block, and/or substructures thereof, based on coding bits associated to the data block, and/or based on coding bits associated to one or more data block and/or subblocks and/or subblock group/s. Acknowledgement information (determined by an acknowledgement signaling process) may pertain to the data block as a whole, and/or to one or more subblocks or subblock groups. A code block may be considered an example of a subblock, whereas a code block group may be considered an example of a subblock group. Accordingly, the associated subpattern may comprise one or more bits indicating reception status or feedback of the data block, and/or one or more bits indicating reception status or feedback of one or more subblocks or subblock groups. Each subpattern or bit of the subpattern may be associated and/or mapped to a specific data block or subblock or subblock group. In some variants, correct reception for a data block may be indicated if all subblocks or subblock groups are correctly identified. In such a case, the subpattern may represent acknowledgement information for the data block as a whole, reducing overhead in comparison to provide acknowledgement information for the subblocks or subblock groups. The smallest structure (e.g. subblock/subblock group/data block) the subpattern provides acknowledgement information for and/or is associated to may be considered its (highest) resolution. In some variants, a subpattern may provide acknowledgement information regarding several elements of a data block structure and/or at different resolution, e.g. to allow more specific error detection. For example, even if a subpattern indicates acknowledgment signaling pertaining to a data block as a whole, in some variants higher resolution (e.g., subblock or subblock group resolution) may be provided by the subpattern. A subpattern may generally comprise one or more bits indicating ACK/NACK for a data block, and/or one or more bits for indicating ACK/NACK for a subblock or subblock group, or for more than one subblock or subblock group.

A subblock and/or subblock group may comprise information bits (representing the data to be transmitted, e.g. user data and/or downlink/sidelink data or uplink data). It may be considered that a data block and/or subblock and/or subblock group also comprises error one or more error detection bits, which may pertain to, and/or be determined based on, the information bits (for a subblock group, the error detection bit/s may be determined based on the information bits and/or error detection bits and/or error correction bits of the subblock/s of the subblock group). A data block or substructure like subblock or subblock group may comprise error correction bits, which may in particular be determined based on the information bits and error detection bits of the block or substructure, e.g. utilising an error correction coding scheme, e.g. LDPC or polar coding. Generally, the error correction coding of a data block structure (and/or associated bits) may cover and/or pertain to information bits and error detection bits of the structure. A subblock group may represent a combination of one or more code blocks, respectively the corresponding bits. A data block may represent a code block or code block group, or a combination of more than one code block groups. A transport block may be split up in code blocks and/or code block groups, for example based on the bit size of the information bits of a higher layer data structure provided for error coding and/or size requirements or preferences for error coding, in particular error correction coding. Such a higher layer data structure is sometimes also referred to as transport block, which in this context represents information bits without the error coding bits described herein, although higher layer error handling information may be included, e.g. for an internet protocol like TCP. However, such error handling information represents information bits in the context of this disclosure, as the acknowledgement signaling procedures described treat it accordingly.

In some variants, a subblock like a code block may comprise error correction bits, which may be determined based on the information bit/s and/or error detection bit/s of the subblock. An error correction coding scheme may be used for determining the error correction bits, e.g. based on LDPC or polar coding or Reed-Mueller coding. In some cases, a subblock or code block may be considered to be defined as a block or pattern of bits comprising information bits, error detection bit/s determined based on the information bits, and error correction bit/s determined based on the information bits and/or error detection bit/s. It may be considered that in a subblock, e.g. code block, the information bits (and possibly the error correction bit/s) are protected and/or covered by the error correction scheme or corresponding error correction bit/s. A code block group may comprise one or more code blocks. In some variants, no additional error detection bits and/or error correction bits are applied, however, it may be considered to apply either or both. A transport block may comprise one or more code block groups. It may be considered that no additional error detection bits and/or error correction bits are applied to a transport block, however, it may be considered to apply either or both. In some specific variants, the code block group/s comprise no additional layers of error detection or correction coding, and the transport block may comprise only additional error detection coding bits, but no additional error correction coding. This may particularly be true if the transport block size is larger than the code block size and/or the maximum size for error correction coding. A subpattern of acknowledgement signaling (in particular indicating ACK or NACK) may pertain to a code block, e.g. indicating whether the code block has been correctly received. It may be considered that a subpattern pertains to a subgroup like a code block group or a data block like a transport block. In such cases, it may indicate ACK, if all subblocks or code blocks of the group or data/transport block are received correctly (e.g. based on a logical AND operation), and NACK or another state of non-correct reception if at least one subblock or code block has not been correctly received. It should be noted that a code block may be considered to be correctly received not only if it actually has been correctly received, but also if it can be correctly reconstructed based on soft-combining and/or the error correction coding.

A subpattern/HARQ structure may pertain to one acknowledgement signaling process and/or one carrier like a component carrier and/or data block structure or data block. It may in particular be considered that one (e.g. specific and/or single) subpattern pertains, e.g. is mapped by the codebook, to one (e.g., specific and/or single) acknowledgement signaling process, e.g. a specific and/or single HARQ process. It may be considered that in the bit pattern, subpatterns are mapped to acknowledgement signaling processes and/or data blocks or data block structures on a one-to-one basis. In some variants, there may be multiple subpatterns (and/or associated acknowledgment signaling processes) associated to the same component carrier, e.g. if multiple data streams transmitted on the carrier are subject to acknowledgement signaling processes. A subpattern may comprise one or more bits, the number of which may be considered to represent its size or bit size. Different bit n-tuples (n being 1 or larger) of a subpattern may be associated to different elements of a data block structure (e.g., data block or subblock or subblock group), and/or represent different resolutions. There may be considered variants in which only one resolution is represented by a bit pattern, e.g. a data block. A bit n-tupel may represent acknowledgement information (also referred to a feedback), in particular ACK or NACK, and optionally, (if n>1), may represent DTX/DRX or other reception states. ACK/NACK may be represented by one bit, or by more than one bit, e.g. to improve disambiguity of bit sequences representing ACK or NACK, and/or to improve transmission reliability.

The acknowledgement information or feedback information may pertain to a plurality of different transmissions, which may be associated to and/or represented by data block structures, respectively the associated data blocks or data signaling. The data block structures, and/or the corresponding blocks and/or signaling, may be scheduled for simultaneous transmission, e.g. for the same transmission timing structure, in particular within the same slot or subframe, and/or on the same symbol/s. However, alternatives with scheduling for non-simultaneous transmission may be considered. For example, the acknowledgment information may pertain to data blocks scheduled for different transmission timing structures, e.g. different slots (or mini-slots, or slots and mini-slots) or similar, which may correspondingly be received (or not or wrongly received). Scheduling signaling may generally comprise indicating resources, e.g. time and/or frequency resources, for example for receiving or transmitting the scheduled signaling.

References to specific resource structures like transmission timing structure and/or symbol and/or slot and/or mini-slot and/or subcarrier and/or carrier may pertain to a specific numerology, which may be predefined and/or configured or configurable. A transmission timing structure may represent a time interval, which may cover one or more symbols. Some examples of a transmission timing structure are transmission time interval (TTI), subframe, slot, subslot, and mini-slot. A slot may comprise a predetermined, e.g. predefined and/or configured or configurable, number of symbols, e.g. 6 or 7, or 12 or 14. A subslot may be (e.g., a configurable or configured or predefined) sub-unit or division of a slot, which may comprise a subset of the symbols in the slot, e.g. consecutive and/or neighbouring symbols. Each subslot of a slot may comprise and/or cover one or more symbols (symbol time intervals) of the slot. Different subslots may have the same number of symbols, or a different number of symbols. A slot configuration configured subslots for a slot may be configured with higher layer signaling, e.g. RRC signaling and/or MAC signaling. It should be noted that in downlink, there may be no configured subslots, or a different slot configuration. The subslot indicated for transmission of acknowledgement information may be subslot in which a suitable resource is available, e.g. a configured PUCCH resource and/or a PUSCH resource. A mini-slot may comprise a number of symbols (which may in particular be configurable or configured) smaller than the number of symbols of a slot, in particular 1, 2, 3 or 4 symbols. A transmission timing structure may cover a time interval of a specific length, which may be dependent on symbol time length and/or cyclic prefix used. A transmission timing structure may pertain to, and/or cover, a specific time interval in a time stream, e.g. synchronized for communication. Timing structures used and/or scheduled for transmission, e.g. slot and/or mini-slots, may be scheduled in relation to, and/or synchronized to, a timing structure provided and/or defined by other transmission timing structures. Such transmission timing structures may define a timing grid, e.g., with symbol time intervals within individual structures representing the smallest timing units. Such a timing grid may for example be defined by slots or subframes (wherein in some cases, subframes may be considered specific variants of slots). A transmission timing structure may have a duration (length in time) determined based on the durations of its symbols, possibly in addition to cyclic prefix/es used. The symbols of a transmission timing structure may have the same duration, or may in some variants have different duration. The number of symbols in a transmission timing structure may be predefined and/or configured or configurable, and/or be dependent on numerology. The timing of a mini-slot may generally be configured or configurable, in particular by the network and/or a network node. The timing may be configurable to start and/or end at any symbol of the transmission timing structure, in particular one or more slots.

There is generally considered a program product comprising instructions adapted for causing processing and/or control circuitry to carry out and/or control any method described herein, in particular when executed on the processing and/or control circuitry. Also, there is considered a carrier medium arrangement carrying and/or storing a program product as described herein.

A carrier medium arrangement may comprise one or more carrier media. Generally, a carrier medium may be accessible and/or readable and/or receivable by processing or control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

A system comprising one or more radio nodes as described herein, in particular a network node and a user equipment, is described. The system may be a wireless communication system, and/or provide and/or represent a radio access network.

Moreover, there may be generally considered a method of operating an information system, the method comprising providing information. Alternatively, or additionally, an information system adapted for providing information may be considered. Providing information may comprise providing information for, and/or to, a target system, which may comprise and/or be implemented as radio access network and/or a radio node, in particular a network node or user equipment or terminal. Providing information may comprise transferring and/or streaming and/or sending and/or passing on the information, and/or offering the information for such and/or for download, and/or triggering such providing, e.g. by triggering a different system or node to stream and/or transfer and/or send and/or pass on the information. The information system may comprise, and/or be connected or connectable to, a target, for example via one or more intermediate systems, e.g. a core network and/or internet and/or private or local network. Information may be provided utilising and/or via such intermediate system/s. Providing information may be for radio transmission and/or for transmission via an air interface and/or utilising a RAN or radio node as described herein. Connecting the information system to a target, and/or providing information, may be based on a target indication, and/or adaptive to a target indication. A target indication may indicate the target, and/or one or more parameters of transmission pertaining to the target and/or the paths or connections over which the information is provided to the target. Such parameter/s may in particular pertain to the air interface and/or radio access network and/or radio node and/or network node. Example parameters may indicate for example type and/or nature of the target, and/or transmission capacity (e.g., data rate) and/or latency and/or reliability and/or cost, respectively one or more estimates thereof. The target indication may be provided by the target, or determined by the information system, e.g. based on information received from the target and/or historical information, and/or be provided by a user, for example a user operating the target or a device in communication with the target, e.g. via the RAN and/or air interface. For example, a user may indicate on a user equipment communicating with the information system that information is to be provided via a RAN, e.g. by selecting from a selection provided by the information system, for example on a user application or user interface, which may be a web interface. An information system may comprise one or more information nodes. An information node may generally comprise processing circuitry and/or communication circuitry. In particular, an information system and/or an information node may be implemented as a computer and/or a computer arrangement, e.g. a host computer or host computer arrangement and/or server or server arrangement. In some variants, an interaction server (e.g., web server) of the information system may provide a user interface, and based on user input may trigger transmitting and/or streaming information provision to the user (and/or the target) from another server, which may be connected or connectable to the interaction server and/or be part of the information system or be connected or connectable thereto. The information may be any kind of data, in particular data intended for a user of for use at a terminal, e.g. video data and/or audio data and/or location data and/or interactive data and/or game-related data and/or environmental data and/or technical data and/or traffic data and/or vehicular data and/or circumstantial data and/or operational data. The information provided by the information system may be mapped to, and/or mappable to, and/or be intended for mapping to, communication or data signaling and/or one or more data channels as described herein (which may be signaling or channel/s of an air interface and/or used within a RAN and/or for radio transmission). It may be considered that the information is formatted based on the target indication and/or target, e.g. regarding data amount and/or data rate and/or data structure and/or timing, which in particular may be pertaining to a mapping to communication or data signaling and/or a data channels. Mapping information to data signaling and/or data channel/s may be considered to refer to using the signaling/channel/s to carry the data, e.g. on higher layers of communication, with the signaling/channel/s underlying the transmission. A target indication generally may comprise different components, which may have different sources, and/or which may indicate different characteristics of the target and/or communication path/s thereto. A format of information may be specifically selected, e.g. from a set of different formats, for information to be transmitted on an air interface and/or by a RAN as described herein. This may be particularly pertinent since an air interface may be limited in terms of capacity and/or of predictability, and/or potentially be cost sensitive. The format may be selected to be adapted to the transmission indication, which may in particular indicate that a RAN or radio node as described herein is in the path (which may be the indicated and/or planned and/or expected path) of information between the target and the information system. A (communication) path of information may represent the interface/s (e.g., air and/or cable interfaces) and/or the intermediate system/s (if any), between the information system and/or the node providing or transferring the information, and the target, over which the information is, or is to be, passed on. A path may be (at least partly) undetermined when a target indication is provided, and/or the information is provided/transferred by the information system, e.g. if an internet is involved, which may comprise multiple, dynamically chosen paths. Information and/or a format used for information may be packet-based, and/or be mapped, and/or be mappable and/or be intended for mapping, to packets. Alternatively, or additionally, there may be considered a method for operating a target device comprising providing a target indicating to an information system. More alternatively, or additionally, a target device may be considered, the target device being adapted for providing a target indication to an information system. In another approach, there may be considered a target indication tool adapted for, and/or comprising an indication module for, providing a target indication to an information system. The target device may generally be a target as described above. A target indication tool may comprise, and/or be implemented as, software and/or application or app, and/or web interface or user interface, and/or may comprise one or more modules for implementing actions performed and/or controlled by the tool. The tool and/or target device may be adapted for, and/or the method may comprise, receiving a user input, based on which a target indicating may be determined and/or provided. Alternatively, or additionally, the tool and/or target device may be adapted for, and/or the method may comprise, receiving information and/or communication signaling carrying information, and/or operating on, and/or presenting (e.g., on a screen and/or as audio or as other form of indication), information. The information may be based on received information and/or communication signaling carrying information. Presenting information may comprise processing received information, e.g. decoding and/or transforming, in particular between different formats, and/or for hardware used for presenting. Operating on information may be independent of or without presenting, and/or proceed or succeed presenting, and/or may be without user interaction or even user reception, for example for automatic processes, or target devices without (e.g., regular) user interaction like MTC devices, of for automotive or transport or industrial use. The information or communication signaling may be expected and/or received based on the target indication. Presenting and/or operating on information may generally comprise one or more processing steps, in particular decoding and/or executing and/or interpreting and/or transforming information. Operating on information may generally comprise relaying and/or transmitting the information, e.g. on an air interface, which may include mapping the information onto signaling (such mapping may generally pertain to one or more layers, e.g. one or more layers of an air interface, e.g. RLC (Radio Link Control) layer and/or MAC layer and/or physical layer/s). The information may be imprinted (or mapped) on communication signaling based on the target indication, which may make it particularly suitable for use in a RAN (e.g., for a target device like a network node or in particular a UE or terminal). The tool may generally be adapted for use on a target device, like a UE or terminal. Generally, the tool may provide multiple functionalities, e.g. for providing and/or selecting the target indication, and/or presenting, e.g. video and/or audio, and/or operating on and/or storing received information. Providing a target indication may comprise transmitting or transferring the indication as signaling, and/or carried on signaling, in a RAN, for example if the target device is a UE, or the tool for a UE. It should be noted that such provided information may be transferred to the information system via one or more additionally communication interfaces and/or paths and/or connections. The target indication may be a higher-layer indication and/or the information provided by the information system may be higher-layer information, e.g. application layer or user-layer, in particular above radio layers like transport layer and physical layer. The target indication may be mapped on physical layer radio signaling, e.g. related to or on the user-plane, and/or the information may be mapped on physical layer radio communication signaling, e.g. related to or on the user-plane (in particular, in reverse communication directions). The described approaches allow a target indication to be provided, facilitating information to be provided in a specific format particularly suitable and/or adapted to efficiently use an air interface. A user input may for example represent a selection from a plurality of possible transmission modes or formats, and/or paths, e.g. in terms of data rate and/or packaging and/or size of information to be provided by the information system.

In general, a numerology and/or subcarrier spacing may indicate the bandwidth (in frequency domain) of a subcarrier of a carrier, and/or the number of subcarriers in a carrier and/or the numbering of the subcarriers in a carrier. Different numerologies may in particular be different in the bandwidth of a subcarrier. In some variants, all the subcarriers in a carrier have the same bandwidth associated to them. The numerology and/or subcarrier spacing may be different between carriers in particular regarding the subcarrier bandwidth. A symbol time length, and/or a time length of a timing structure pertaining to a carrier may be dependent on the carrier frequency, and/or the subcarrier spacing and/or the numerology. In particular, different numerologies may have different symbol time lengths.

Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

Reference signaling may be signaling comprising one or more reference symbols and/or structures. Reference signaling may be adapted for gauging and/or estimating and/or representing transmission conditions, e.g. channel conditions and/or transmission path conditions and/or channel (or signal or transmission) quality. It may be considered that the transmission characteristics (e.g., signal strength and/or form and/or modulation and/or timing) of reference signaling are available for both transmitter and receiver of the signaling (e.g., due to being predefined and/or configured or configurable and/or being communicated). Different types of reference signaling may be considered, e.g. pertaining to uplink, downlink or sidelink, cell-specific (in particular, cell-wide, e.g., CRS) or device or user specific (addressed to a specific target or user equipment, e.g., CSI-RS), demodulation-related (e.g., DMRS) and/or signal strength related, e.g. power-related or energy-related or amplitude-related (e.g., SRS or pilot signaling) and/or phase-related, etc.

An antenna arrangement may comprise one or more antenna elements (radiating elements), which may be combined in antenna arrays. An antenna array or subarray may comprise one antenna element, or a plurality of antenna elements, which may be arranged e.g. two dimensionally (for example, a panel) or three dimensionally. It may be considered that each antenna array or subarray or element is separately controllable, respectively that different antenna arrays are controllable separately from each other. A single antenna element/radiator may be considered the smallest example of a subarray. Examples of antenna arrays comprise one or more multi-antenna panels or one or more individually controllable antenna elements. An antenna arrangement may comprise a plurality of antenna arrays. It may be considered that an antenna arrangement is associated to a (specific and/or single) radio node, e.g. a configuring or informing or scheduling radio node, e.g. to be controlled or controllable by the radio node. An antenna arrangement associated to a UE or terminal may be smaller (e.g., in size and/or number of antenna elements or arrays) than the antenna arrangement associated to a network node. Antenna elements of an antenna arrangement may be configurable for different arrays, e.g. to change the beam forming characteristics. In particular, antenna arrays may be formed by combining one or more independently or separately controllable antenna elements or subarrays. The beams may be provided by analog beamforming, or in some variants by digital beamforming. The informing radio nodes may be configured with the manner of beam transmission, e.g. by transmitting a corresponding indicator or indication, for example as beam identify indication. However, there may be considered cases in which the informing radio node/s are not configured with such information, and/or operate transparently, not knowing the way of beamforming used. An antenna arrangement may be considered separately controllable in regard to the phase and/or amplitude/power and/or gain of a signal feed to it for transmission, and/or separately controllable antenna arrangements may comprise an independent or separate transmit and/or receive unit and/or ADC (Analog-Digital-Converter, alternatively an ADC chain) to convert digital control information into an analog antenna feed for the whole antenna arrangement (the ADC may be considered part of, and/or connected or connectable to, antenna circuitry). A scenario in which each antenna element is individually controllable may be referred to as digital beamforming, whereas a scenario in which larger arrays/subarrays are separately controllable may be considered an example of analog beamforming. Hybrid forms may be considered.

Uplink or sidelink signaling may be OFDMA (Orthogonal Frequency Division Multiple Access) or SC-FDMA (Single Carrier Frequency Division Multiple Access) signaling. Downlink signaling may in particular be OFDMA signaling. However, signaling is not limited thereto (Filter-Bank based signaling may be considered one alternative).

A radio node may generally be considered a device or node adapted for wireless and/or radio (and/or microwave) frequency communication, and/or for communication utilising an air interface, e.g. according to a communication standard.

A radio node may be a network node, or a user equipment or terminal. A network node may be any radio node of a wireless communication network, e.g. a base station and/or gNodeB (gNB) and/or eNodeB (eNB) and/or relay node and/or micro/nano/pico/femto node and/or transmission point (TP) and/or access point (AP) and/or other node, in particular for a RAN as described herein.

The terms user equipment (UE) and terminal may be considered to be interchangeable in the context of this disclosure. A wireless device, user equipment or terminal may represent an end device for communication utilising the wireless communication network, and/or be implemented as a user equipment according to a standard. Examples of user equipments may comprise a phone like a smartphone, a personal communication device, a mobile phone or terminal, a computer, in particular laptop, a sensor or machine with radio capability (and/or adapted for the air interface), in particular for MTC (Machine-Type-Communication, sometimes also referred to M2M, Machine-To-Machine), or a vehicle adapted for wireless communication. A user equipment or terminal may be mobile or stationary. A wireless device generally may comprise, and/or be implemented as, processing circuitry and/or radio circuitry, which may comprise one or more chips or sets of chips. The circuitry and/or circuitries may be packaged, e.g. in a chip housing, and/or may have one or more physical interfaces to interact with other circuitry and/or for power supply. Such a wireless device may be intended for use in a user equipment or terminal.

A radio node may generally comprise processing circuitry and/or radio circuitry. A radio node, in particular a network node, may in some cases comprise cable circuitry and/or communication circuitry, with which it may be connected or connectable to another radio node and/or a core network.

Circuitry may comprise integrated circuitry. Processing circuitry may comprise one or more processors and/or controllers (e.g., microcontrollers), and/or ASICs (Application Specific Integrated Circuitry) and/or FPGAs (Field Programmable Gate Array), or similar. It may be considered that processing circuitry comprises, and/or is (operatively) connected or connectable to one or more memories or memory arrangements. A memory arrangement may comprise one or more memories. A memory may be adapted to store digital information. Examples for memories comprise volatile and non-volatile memory, and/or Random Access Memory (RAM), and/or Read-Only-Memory (ROM), and/or magnetic and/or optical memory, and/or flash memory, and/or hard disk memory, and/or EPROM or EEPROM (Erasable Programmable ROM or Electrically Erasable Programmable ROM).

Radio circuitry may comprise one or more transmitters and/or receivers and/or transceivers (a transceiver may operate or be operable as transmitter and receiver, and/or may comprise joint or separated circuitry for receiving and transmitting, e.g. in one package or housing), and/or may comprise one or more amplifiers and/or oscillators and/or filters, and/or may comprise, and/or be connected or connectable to antenna circuitry and/or one or more antennas and/or antenna arrays. An antenna array may comprise one or more antennas, which may be arranged in a dimensional array, e.g. 2D or 3D array, and/or antenna panels. A remote radio head (RRH) may be considered as an example of an antenna array. However, in some variants, a RRH may be also be implemented as a network node, depending on the kind of circuitry and/or functionality implemented therein.

Communication circuitry may comprise radio circuitry and/or cable circuitry. Communication circuitry generally may comprise one or more interfaces, which may be air interface/s and/or cable interface/s and/or optical interface/s, e.g. laser-based. Interface/s may be in particular packet-based. Cable circuitry and/or a cable interfaces may comprise, and/or be connected or connectable to, one or more cables (e.g., optical fiber-based and/or wire-based), which may be directly or indirectly (e.g., via one or more intermediate systems and/or interfaces) be connected or connectable to a target, e.g. controlled by communication circuitry and/or processing circuitry.

Any one or all of the modules disclosed herein may be implemented in software and/or firmware and/or hardware. Different modules may be associated to different components of a radio node, e.g. different circuitries or different parts of a circuitry. It may be considered that a module is distributed over different components and/or circuitries. A program product as described herein may comprise the modules related to a device on which the program product is intended (e.g., a user equipment or network node) to be executed (the execution may be performed on, and/or controlled by the associated circuitry).

A radio access network may be a wireless communication network, and/or a Radio Access Network (RAN) in particular according to a communication standard. A communication standard may in particular a standard according to 3GPP and/or 5G, e.g. according to NR or LTE, in particular LTE Evolution.

A wireless communication network may be and/or comprise a Radio Access Network (RAN), which may be and/or comprise any kind of cellular and/or wireless radio network, which may be connected or connectable to a core network. The approaches described herein are particularly suitable for a 5G network, e.g. LTE Evolution and/or NR (New Radio), respectively successors thereof. A RAN may comprise one or more network nodes, and/or one or more terminals, and/or one or more radio nodes. A network node may in particular be a radio node adapted for radio and/or wireless and/or cellular communication with one or more terminals. A terminal may be any device adapted for radio and/or wireless and/or cellular communication with or within a RAN, e.g. a user equipment (UE) or mobile phone or smartphone or computing device or vehicular communication device or device for machine-type-communication (MTC), etc. A terminal may be mobile, or in some cases stationary. A RAN or a wireless communication network may comprise at least one network node and a UE, or at least two radio nodes. There may be generally considered a wireless communication network or system, e.g. a RAN or RAN system, comprising at least one radio node, and/or at least one network node and at least one terminal.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Control information or a control information message or corresponding signaling (control signaling) may be transmitted on a control channel, e.g. a physical control channel, which may be a downlink channel or (or a sidelink channel in some cases, e.g. one UE scheduling another UE). For example, control information/allocation information may be signaled by a network node on PDCCH (Physical Downlink Control Channel) and/or a PDSCH (Physical Downlink Shared Channel) and/or a HARQ-specific channel. Acknowledgement signaling, e.g. as a form of control information or signaling like uplink control information/signaling, may be transmitted by a terminal on a PUCCH (Physical Uplink Control Channel) and/or PUSCH (Physical Uplink Shared Channel) and/or a HARQ-specific channel. Multiple channels may apply for multi-component/multi-carrier indication or signaling.

Signaling may generally be considered to represent an electromagnetic wave structure (e.g., over a time interval and frequency interval), which is intended to convey information to at least one specific or generic (e.g., anyone who might pick up the signaling) target. A process of signaling may comprise transmitting the signaling. Transmitting signaling, in particular control signaling or communication signaling, e.g. comprising or representing acknowledgement signaling and/or resource requesting information, may comprise encoding and/or modulating. Encoding and/or modulating may comprise error detection coding and/or forward error correction encoding and/or scrambling. Receiving control signaling may comprise corresponding decoding and/or demodulation. Error detection coding may comprise, and/or be based on, parity or checksum approaches, e.g. CRC (Cyclic Redundancy Check). Forward error correction coding may comprise and/or be based on for example turbo coding and/or Reed-Muller coding, and/or polar coding and/or LDPC coding (Low Density Parity Check). The type of coding used may be based on the channel (e.g., physical channel) the coded signal is associated to. A code rate may represent the ratio of the number of information bits before encoding to the number of encoded bits after encoding, considering that encoding adds coding bits for error detection coding and forward error correction. Coded bits may refer to information bits (also called systematic bits) plus coding bits.

Communication signaling may comprise, and/or represent, and/or be implemented as, data signaling, and/or user plane signaling. Communication signaling may be associated to a data channel, e.g. a physical downlink channel or physical uplink channel or physical sidelink channel, in particular a PDSCH (Physical Downlink Shared Channel) or PSSCH (Physical Sidelink Shared Channel). Generally, a data channel may be a shared channel or a dedicated channel. Data signaling may be signaling associated to and/or on a data channel.

An indication generally may explicitly and/or implicitly indicate the information it represents and/or indicates. Implicit indication may for example be based on position and/or resource used for transmission. Explicit indication may for example be based on a parametrisation with one or more parameters, and/or one or more index or indices, and/or one or more bit patterns representing the information. It may in particular be considered that control signaling as described herein, based on the utilised resource sequence, implicitly indicates the control signaling type. Indexing a table may also comprise and/or be represented by indicating and/or referencing equivalent or isomorphic representations, e.g. according to a suitable list or memory field.

A resource element may generally describe the smallest individually usable and/or encodable and/or decodable and/or modulatable and/or demodulatable time-frequency resource, and/or may describe a time-frequency resource covering a symbol time length in time and a subcarrier in frequency. A signal may be allocatable and/or allocated to a resource element. A subcarrier may be a subband of a carrier, e.g. as defined by a standard. A carrier may define a frequency and/or frequency band for transmission and/or reception. In some variants, a signal (jointly encoded/modulated) may cover more than one resource elements. A resource element may generally be as defined by a corresponding standard, e.g. NR or LTE. As symbol time length and/or subcarrier spacing (and/or numerology) may be different between different symbols and/or subcarriers, different resource elements may have different extension (length/width) in time and/or frequency domain, in particular resource elements pertaining to different carriers.

A resource generally may represent a time-frequency and/or code resource, on which signaling, e.g. according to a specific format, may be communicated, for example transmitted and/or received, and/or be intended for transmission and/or reception.

A border symbol may generally represent a starting symbol or an ending symbol for transmitting and/or receiving. A starting symbol may in particular be a starting symbol of uplink or sidelink signaling, for example control signaling or data signaling. Such signaling may be on a data channel or control channel, e.g. a physical channel, in particular a physical uplink shared channel (like PUSCH) or a sidelink data or shared channel, or a physical uplink control channel (like PUCCH) or a sidelink control channel. If the starting symbol is associated to control signaling (e.g., on a control channel), the control signaling may be in response to received signaling (in sidelink or downlink), e.g. representing acknowledgement signaling associated thereto, which may be HARQ or ARQ signaling. An ending symbol may represent an ending symbol (in time) of downlink or sidelink transmission or signaling, which may be intended or scheduled for the radio node or user equipment. Such downlink signaling may in particular be data signaling, e.g. on a physical downlink channel like a shared channel, e.g. a PDSCH (Physical Downlink Shared Channel). A starting symbol may be determined based on, and/or in relation to, such an ending symbol.

Configuring a radio node, in particular a terminal or user equipment, may refer to the radio node being adapted or caused or set and/or instructed to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources. A radio node may configure itself, e.g., based on configuration data received from a network or network node. A network node may utilise, and/or be adapted to utilise, its circuitry/ies for configuring. Allocation information may be considered a form of configuration data. Configuration data may comprise and/or be represented by configuration information, and/or one or more corresponding indications and/or message/s Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor.

A resource structure may be considered to be neighbored in frequency domain by another resource structure, if they share a common border frequency, e.g. one as an upper frequency border and the other as a lower frequency border. Such a border may for example be represented by the upper end of a bandwidth assigned to a subcarrier n, which also represents the lower end of a bandwidth assigned to a subcarrier n+1. A resource structure may be considered to be neighbored in time domain by another resource structure, if they share a common border time, e.g. one as an upper (or right in the figures) border and the other as a lower (or left in the figures) border. Such a border may for example be represented by the end of the symbol time interval assigned to a symbol n, which also represents the beginning of a symbol time interval assigned to a symbol n+1.

Generally, a resource structure being neighbored by another resource structure in a domain may also be referred to as abutting and/or bordering the other resource structure in the domain.

A resource structure may general represent a structure in time and/or frequency domain, in particular representing a time interval and a frequency interval. A resource structure may comprise and/or be comprised of resource elements, and/or the time interval of a resource structure may comprise and/or be comprised of symbol time interval/s, and/or the frequency interval of a resource structure may comprise and/or be comprised of subcarrier/s. A resource element may be considered an example for a resource structure, a slot or mini-slot or a Physical Resource Block (PRB) or parts thereof may be considered others. A resource structure may be associated to a specific channel, e.g. a PUSCH or PUCCH, in particular resource structure smaller than a slot or PRB.

Examples of a resource structure in frequency domain comprise a bandwidth or band, or a bandwidth part. A bandwidth part may be a part of a bandwidth available for a radio node for communicating, e.g. due to circuitry and/or configuration and/or regulations and/or a standard. A bandwidth part may be configured or configurable to a radio node. In some variants, a bandwidth part may be the part of a bandwidth used for communicating, e.g. transmitting and/or receiving, by a radio node. The bandwidth part may be smaller than the bandwidth (which may be a device bandwidth defined by the circuitry/configuration of a device, and/or a system bandwidth, e.g. available for a RAN). It may be considered that a bandwidth part comprises one or more resource blocks or resource block groups, in particular one or more PRBs or PRB groups. A bandwidth part may pertain to, and/or comprise, one or more carriers.

A carrier may generally represent a frequency range or band and/or pertain to a central frequency and an associated frequency interval. It may be considered that a carrier comprises a plurality of subcarriers. A carrier may have assigned to it a central frequency or center frequency interval, e.g. represented by one or more subcarriers (to each subcarrier there may be generally assigned a frequency bandwidth or interval). Different carriers may be non-overlapping, and/or may be neighboring in frequency domain.

It should be noted that the term "radio" in this disclosure may be considered to pertain to wireless communication in general, and may also include wireless communication utilising microwave and/or millimeter and/or other frequencies, in particular between 100 MHz or 1 GHz, and 100 GHz or 20 or 10 GHz. Such communication may utilise one or more carriers.

A radio node, in particular a network node or a terminal, may generally be any device adapted for transmitting and/or receiving radio and/or wireless signals and/or data, in particular communication data, in particular on at least one carrier. The at least one carrier may comprise a carrier accessed based on a LBT procedure (which may be called LBT carrier), e.g., an unlicensed carrier. It may be considered that the carrier is part of a carrier aggregate.

Receiving or transmitting on a cell or carrier may refer to receiving or transmitting utilizing a frequency (band) or spectrum associated to the cell or carrier. A cell may generally comprise and/or be defined by or for one or more carriers, in particular at least one carrier for UL communication/transmission (called UL carrier) and at least one carrier for DL communication/transmission (called DL carrier). It may be considered that a cell comprises different numbers of UL carriers and DL carriers. Alternatively, or additionally, a cell may comprise at least one carrier for UL communication/transmission and DL communication/transmission, e.g., in TDD-based approaches.

A channel may generally be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel, in particular if it is a physical layer channel and/or if it carries user plane information. A channel may be defined for a specific communication direction, or for two complementary communication directions (e.g., UL and DL, or sidelink in two directions), in which case it may be considered to have two component channels, one for each direction. Examples of channels comprise a channel for low latency and/or high reliability transmission, in particular a channel for Ultra-Reliable Low Latency Communication (URLLC), which may be for control and/or data.

In general, a symbol may represent and/or be associated to a symbol time length, which may be dependent on the carrier and/or subcarrier spacing and/or numerology of the associated carrier. Accordingly, a symbol may be considered to indicate a time interval having a symbol time length in relation to frequency domain. A symbol time length may be dependent on a carrier frequency and/or bandwidth and/or numerology and/or subcarrier spacing of, or associated to, a symbol. Accordingly, different symbols may have different symbol time lengths. In particular, numerologies with different subcarrier spacings may have different symbol time length. Generally, a symbol time length may be based on, and/or include, a guard time interval or cyclic extension, e.g. prefix or postfix.

A sidelink may generally represent a communication channel (or channel structure) between two UEs and/or terminals, in which data is transmitted between the participants (UEs and/or terminals) via the communication channel, e.g. directly and/or without being relayed via a network node. A sidelink may be established only and/or directly via air interface/s of the participant, which may be directly linked via the sidelink communication channel. In some variants, sidelink communication may be performed without interaction by a network node, e.g. on fixedly defined resources and/or on resources negotiated between the participants. Alternatively, or additionally, it may be considered that a network node provides some control functionality, e.g. by configuring resources, in particular one or more resource pool/s, for sidelink communication, and/or monitoring a sidelink, e.g. for charging purposes.

Sidelink communication may also be referred to as device-to-device (D2D) communication, and/or in some cases as ProSe (Proximity Services) communication, e.g. in the context of LTE. A sidelink may be implemented in the context of V2x communication (Vehicular communication), e.g. V2V (Vehicle-to-Vehicle), V2I (Vehicle-to-Infrastructure) and/or V2P (Vehicle-to-Person). Any device adapted for sidelink communication may be considered a user equipment or terminal.

A sidelink communication channel (or structure) may comprise one or more (e.g., physical or logical) channels, e.g. a PSCCH (Physical Sidelink Control CHannel, which may for example carry control information like an acknowledgement position indication, and/or a PSSCH (Physical Sidelink Shared CHannel, which for example may carry data and/or acknowledgement signaling). It may be considered that a sidelink communication channel (or structure) pertains to and/or used one or more carrier/s and/or frequency range/s associated to, and/or being used by, cellular communication, e.g. according to a specific license and/or standard. Participants may share a (physical) channel and/or resources, in particular in frequency domain and/or related to a frequency resource like a carrier) of a sidelink, such that two or more participants transmit thereon, e.g. simultaneously, and/or time-shifted, and/or there may be associated specific channels and/or resources to specific participants, so that for example only one participant transmits on a specific channel or on a specific resource or specific resources, e.g., in frequency domain and/or related to one or more carriers or subcarriers.

A sidelink may comply with, and/or be implemented according to, a specific standard, e.g. a LTE-based standard and/or NR. A sidelink may utilise TDD (Time Division Duplex) and/or FDD (Frequency Division Duplex) technology, e.g. as configured by a network node, and/or preconfigured and/or negotiated between the participants. A user equipment may be considered to be adapted for sidelink communication if it, and/or its radio circuitry and/or processing circuitry, is adapted for utilising a sidelink, e.g. on one or more frequency ranges and/or carriers and/or in one or more formats, in particular according to a specific standard. It may be generally considered that a Radio Access Network is defined by two participants of a sidelink communication. Alternatively, or additionally, a Radio Access Network may be represented, and/or defined with, and/or be related to a network node and/or communication with such a node.

Communication or communicating may generally comprise transmitting and/or receiving signaling. Communication on a sidelink (or sidelink signaling) may comprise utilising the sidelink for communication (respectively, for signaling). Sidelink transmission and/or transmitting on a sidelink may be considered to comprise transmission utilising the sidelink, e.g. associated resources and/or transmission formats and/or circuitry and/or the air interface. Sidelink reception and/or receiving on a sidelink may be considered to comprise reception utilising the sidelink, e.g. associated resources and/or transmission formats and/or circuitry and/or the air interface. Sidelink control information (e.g., SCI) may generally be considered to comprise control information transmitted utilising a sidelink. Communicating or signaling may in some cases be based on TDD operation, and in other cases on FDD operation.

Generally, carrier aggregation (CA) may refer to the concept of a radio connection and/or communication link between a wireless and/or cellular communication network and/or network node and a terminal or on a sidelink comprising a plurality of carriers for at least one direction of transmission (e.g. DL and/or UL), as well as to the aggregate of carriers. A corresponding communication link may be referred to as carrier aggregated communication link or CA communication link; carriers in a carrier aggregate may be referred to as component carriers (CC). In such a link, data may be transmitted over more than one of the carriers and/or all the carriers of the carrier aggregation (the aggregate of carriers). A carrier aggregation may comprise one (or more) dedicated control carriers and/or primary carriers (which may e.g. be referred to as primary component carrier or PCC), over which control information may be transmitted, wherein the control information may refer to the primary carrier and other carriers, which may be referred to as secondary carriers (or secondary component carrier, SCC). However, in some approaches, control information may be sent over more than one carrier of an aggregate, e.g. one or more PCCs and one PCC and one or more SCCs.

A transmission may generally pertain to a specific channel and/or specific resources, in particular with a starting symbol and ending symbol in time, covering the interval therebetween. A scheduled transmission may be a transmission scheduled and/or expected and/or for which resources are scheduled or provided or reserved. However, not every scheduled transmission has to be realized. For example, a scheduled downlink transmission may not be received, or a scheduled uplink transmission may not be transmitted due to power limitations, or other influences (e.g., a channel on an unlicensed carrier being occupied). A transmission may be scheduled for a transmission timing substructure (e.g., a mini-slot, and/or covering only a part of a transmission timing structure) within a transmission timing structure like a slot. A border symbol may be indicative of a symbol in the transmission timing structure at which the transmission starts or ends.

Predefined in the context of this disclosure may refer to the related information being defined for example in a standard, and/or being available without specific configuration from a network or network node, e.g. stored in memory, for example independent of being configured. Configured or configurable may be considered to pertain to the corresponding information being set/configured, e.g. by the network or a network node.

A configuration or schedule, like a mini-slot configuration and/or structure configuration, may schedule transmissions, e.g. for the time/transmissions it is valid, and/or transmissions may be scheduled by separate signaling or separate configuration, e.g. separate RRC signaling and/or downlink control information signaling. The transmission/s scheduled may represent signaling to be transmitted by the device for which it is scheduled, or signaling to be received by the device for which it is scheduled, depending on which side of a communication the device is. It should be noted that downlink control information or specifically DCI signaling may be considered physical layer signaling, in contrast to higher layer signaling like MAC (Medium Access Control) signaling or RRC layer signaling. The higher the layer of signaling is, the less frequent/the more time/resource consuming it may be considered, at least partially due to the information contained in such signaling having to be passed on through several layers, each layer requiring processing and handling.

A scheduled transmission, and/or transmission timing structure like a mini-slot or slot, may pertain to a specific channel, in particular a physical uplink shared channel, a physical uplink control channel, or a physical downlink shared channel, e.g. PUSCH, PUCCH or PDSCH, and/or may pertain to a specific cell and/or carrier aggregation. A corresponding configuration, e.g. scheduling configuration or symbol configuration may pertain to such channel, cell and/or carrier aggregation. It may be considered that the scheduled transmission represents transmission on a physical channel, in particular a shared physical channel, for example a physical uplink shared channel or physical downlink shared channel. For such channels, semi-persistent configuring may be particularly suitable.

Generally, a configuration may be a configuration indicating timing, and/or be represented or configured with corresponding configuration data. A configuration may be embedded in, and/or comprised in, a message or configuration or corresponding data, which may indicate and/or schedule resources, in particular semi-persistently and/or semi-statically.

A control region of a transmission timing structure may be an interval in time for intended or scheduled or reserved for control signaling, in particular downlink control signaling, and/or for a specific control channel, e.g. a physical downlink control channel like PDCCH. The interval may comprise, and/or consist of, a number of symbols in time, which may be configured or configurable, e.g. by (UE-specific) dedicated signaling (which may be single-cast, for example addressed to or intended for a specific UE), e.g. on a PDCCH, or RRC signaling, or on a multicast or broadcast channel. In general, the transmission timing structure may comprise a control region covering a configurable number of symbols. It may be considered that in general the border symbol is configured to be after the control region in time.

The duration of a symbol (symbol time length or interval) of the transmission timing structure may generally be dependent on a numerology and/or carrier, wherein the numerology and/or carrier may be configurable. The numerology may be the numerology to be used for the scheduled transmission.

Scheduling a device, or for a device, and/or related transmission or signaling, may be considered comprising, or being a form of, configuring the device with resources, and/or of indicating to the device resources, e.g. to use for communicating. Scheduling may in particular pertain to a transmission timing structure, or a substructure thereof (e.g., a slot or a mini-slot, which may be considered a substructure of a slot). It may be considered that a border symbol may be identified and/or determined in relation to the transmission timing structure even if for a substructure being scheduled, e.g. if an underlying timing grid is defined based on the transmission timing structure. Signaling indicating scheduling may comprise corresponding scheduling information and/or be considered to represent or contain configuration data indicating the scheduled transmission and/or comprising scheduling information. Such configuration data or signaling may be considered a resource configuration or scheduling configuration. It should be noted that such a configuration (in particular as single message) in some cases may not be complete without other configuration data, e.g. configured with other signaling, e.g. higher layer signaling. In particular, the symbol configuration may be provided in addition to scheduling/resource configuration to identify exactly which symbols are assigned to a scheduled transmission. A scheduling (or resource) configuration may indicate transmission timing structure/s and/or resource amount (e.g., in number of symbols or length in time) for a scheduled transmission.

A scheduled transmission may be transmission scheduled, e.g. by the network or network node. Transmission may in this context may be uplink (UL) or downlink (DL) or sidelink (SL) transmission. A device, e.g. a user equipment, for which the scheduled transmission is scheduled, may accordingly be scheduled to receive (e.g., in DL or SL), or to transmit (e.g. in UL or SL) the scheduled transmission. Scheduling transmission may in particular be considered to comprise configuring a scheduled device with resource/s for this transmission, and/or informing the device that the transmission is intended and/or scheduled for some resources. A transmission may be scheduled to cover a time interval, in particular a successive number of symbols, which may form a continuous interval in time between (and including) a starting symbol and an ending symbols. The starting symbol and the ending symbol of a (e.g., scheduled) transmission may be within the same transmission timing structure, e.g. the same slot. However, in some cases, the ending symbol may be in a later transmission timing structure than the starting symbol, in particular a structure following in time. To a scheduled transmission, a duration may be associated and/or indicated, e.g. in a number of symbols or associated time intervals. In some variants, there may be different transmissions scheduled in the same transmission timing structure. A scheduled transmission may be considered to be associated to a specific channel, e.g. a shared channel like PUSCH or PDSCH.

In the context of this disclosure, there may be distinguished between dynamically scheduled or aperiodic transmission and/or configuration, and semi-static or semi-persistent or periodic transmission and/or configuration. The term "dynamic" or similar terms may generally pertain to configuration/transmission valid and/or scheduled and/or configured for (relatively) short timescales and/or a (e.g., predefined and/or configured and/or limited and/or definite) number of occurrences and/or transmission timing structures, e.g. one or more transmission timing structures like slots or slot aggregations, and/or for one or more (e.g., specific number) of transmission/occurrences. Dynamic configuration may be based on low-level signaling, e.g. control signaling on the physical layer and/or MAC layer, in particular in the form of DCI or SCI. Periodic/semi-static may pertain to longer timescales, e.g. several slots and/or more than one frame, and/or a non-defined number of occurrences, e.g., until a dynamic configuration contradicts, or until a new periodic configuration arrives. A periodic or semi-static configuration may be based on, and/or be configured with, higher-layer signaling, in particular RCL layer signaling and/or RRC signaling and/or MAC signaling.

A transmission timing structure may comprise a plurality of symbols, and/or define an interval comprising several symbols (respectively their associated time intervals). In the context of this disclosure, it should be noted that a reference to a symbol for ease of reference may be interpreted to refer to the time domain projection or time interval or time component or duration or length in time of the symbol, unless it is clear from the context that the frequency domain component also has to be considered. Examples of transmission timing structures include slot, subframe, mini-slot (which also may be considered a substructure of a slot), slot aggregation (which may comprise a plurality of slots and may be considered a superstructure of a slot), respectively their time domain component. A transmission timing structure may generally comprise a plurality of symbols defining the time domain extension (e.g., interval or length or duration) of the transmission timing structure, and arranged neighbouring to each other in a numbered sequence. A timing structure (which may also be considered or implemented as synchronisation structure) may be defined by a succession of such transmission timing structures, which may for example define a timing grid with symbols representing the smallest grid structures. A transmission timing structure, and/or a border symbol or a scheduled transmission may be determined or scheduled in relation to such a timing grid. A transmission timing structure of reception may be the transmission timing structure in which the scheduling control signaling is received, e.g. in relation to the timing grid. A transmission timing structure may in particular be a slot or subframe or in some cases, a mini-slot.

Feedback signaling may be considered a form or control signaling, e.g. uplink or sidelink control signaling, like UCI (Uplink Control Information) signaling or SCI (Sidelink Control Information) signaling. Feedback signaling may in particular comprise and/or represent acknowledgement signaling and/or acknowledgement information and/or measurement reporting.

Acknowledgement information may comprise an indication of a specific value or state for an acknowledgement signaling process, e.g. ACK or NACK or DTX. Such an indication may for example represent a bit or bit value or bit pattern or an information switch. Different levels of acknowledgement information, e.g. providing differentiated information about quality of reception and/or error position in received data element/s may be considered and/or represented by control signaling. Acknowledgment information may generally indicate acknowledgment or non-acknowledgment or non-reception or different levels thereof, e.g. representing ACK or NACK or DTX. Acknowledgment information may pertain to one acknowledgement signaling process. Acknowledgement signaling may comprise acknowledgement information pertaining to one or more acknowledgement signaling processes, in particular one or more HARQ or ARQ processes. It may be considered that to each acknowledgment signaling process the acknowledgement information pertains to, a specific number of bits of the information size of the control signaling is assigned. Measurement reporting signaling may comprise measurement information.

Signaling may generally comprise one or more symbols and/or signals and/or messages. A signal may comprise and/or represent one or more bits, which may be modulated into a common modulated signal. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different acknowledgement signaling processes, e.g. representing and/or pertaining to one or more such processes. An indication may comprise signaling and/or a plurality of signals and/or messages and/or may be comprised therein, which may be transmitted on different carriers and/or be associated to different acknowledgement signaling processes, e.g. representing and/or pertaining to one or more such processes.

Signaling utilising, and/or on and/or associated to, resources or a resource structure may be signaling covering the resources or structure, signaling on the associated frequency/ies and/or in the associated time interval/s. It may be considered that a signaling resource structure comprises and/or encompasses one or more substructures, which may be associated to one or more different channels and/or types of signaling and/or comprise one or more holes (resource element/s not scheduled for transmissions or reception of transmissions). A resource substructure, e.g. a feedback resource structure, may generally be continuous in time and/or frequency, within the associated intervals. It may be considered that a substructure, in particular a feedback resource structure, represents a rectangle filled with one or more resource elements in time/frequency space. However, in some cases, a resource structure or substructure, in particular a frequency resource range, may represent a non-continuous pattern of resources in one or more domains, e.g. time and/or frequency. The resource elements of a substructure may be scheduled for associated signaling.

It should generally be noted that the number of bits or a bit rate associated to specific signaling that can be carried on a resource element may be based on a modulation and coding scheme (MCS). Thus, bits or a bit rate may be seen as a form of resources representing a resource structure or range in frequency and/or time, e.g. depending on MCS. The MCS may be configured or configurable, e.g. by control signaling, e.g. DCI or MAC (Medium Access Control) or RRC (Radio Resource Control) signaling.

Different formats of for control information may be considered, e.g. different formats for a control channel like a Physical Uplink Control Channel (PUCCH). PUCCH may carry control information or corresponding control signaling, e.g. Uplink Control Information (UCI). UCI may comprise feedback signaling, and/or acknowledgement signaling like HARQ feedback (ACK/NACK), and/or measurement information signaling, e.g. comprising Channel Quality Information (COI), and/or Scheduling Request (SR) signaling. One of the supported PUCCH formats may be short, and may e.g. occur at the end of a slot interval, and/or multiplexed and/or neighboring to PUSCH. Similar control information may be provided on a sidelink, e.g. as Sidelink Control Information (SCI), in particular on a (physical) sidelink control channel, like a (P)SCCH.

A code block may be considered a subelement of a data element like a transport block, e.g., a transport block may comprise a one or a plurality of code blocks, which may be arranged or grouped in code block groups.

A scheduling assignment may be configured with control signaling, e.g. downlink control signaling or sidelink control signaling. Such controls signaling may be considered to represent and/or comprise scheduling signaling, which may indicate scheduling information. A scheduling assignment may be considered scheduling information indicating scheduling of signaling/transmission of signaling, in particular pertaining to signaling received or to be received by the device configured with the scheduling assignment. It may be considered that a scheduling assignment may indicate data (e.g., data block or element and/or channel and/or data stream) and/or an (associated) acknowledgement signaling process and/or resource/s on which the data (or, in some cases, reference signaling) is to be received and/or indicate resource/s for associated feedback signaling, and/or a feedback resource range on which associated feedback signaling is to be transmitted. Transmission associated to an acknowledgement signaling process, and/or the associated resources or resource structure, may be configured and/or scheduled, for example by a scheduling assignment. Different scheduling assignments may be associated to different acknowledgement signaling processes. A scheduling assignment may be considered an example of downlink control information or signaling, e.g. if transmitted by a network node and/or provided on downlink (or sidelink control information if transmitted using a sidelink and/or by a user equipment).

A scheduling grant (e.g., uplink grant) may represent control signaling (e.g., downlink control information/signaling). It may be considered that a scheduling grant configures the signaling resource range and/or resources for uplink (or sidelink) signaling, in particular uplink control signaling and/or feedback signaling, e.g. acknowledgement signaling. Configuring the signaling resource range and/or resources may comprise configuring or scheduling it for transmission by the configured radio node. A scheduling grant may indicate a channel and/or possible channels to be used/usable for the feedback signaling, in particular whether a shared channel like a PUSCH may be used/is to be used. A scheduling grant may generally indicate uplink resource/s and/or an uplink channel and/or a format for control information pertaining to associated scheduling assignments. Both grant and assignment/s may be considered (downlink or sidelink) control information, and/or be associated to, and/or transmitted with, different messages.

A resource structure in frequency domain (which may be referred to as frequency interval and/or range) may be represented by a subcarrier grouping. A subcarrier grouping may comprise one or more subcarriers, each of which may represent a specific frequency interval, and/or bandwidth. The bandwidth of a subcarrier, the length of the interval in frequency domain, may be determined by the subcarrier spacing and/or numerology. The subcarriers may be arranged such that each subcarrier neighbours at least one other subcarrier of the grouping in frequency space (for grouping sizes larger than 1). The subcarriers of a grouping may be associated to the same carrier, e.g. configurably or configured of predefined. A physical resource block may be considered representative of a grouping (in frequency domain). A subcarrier grouping may be considered to be associated to a specific channel and/or type of signaling, it transmission for such channel or signaling is scheduled and/or transmitted and/or intended and/or configured for at least one, or a plurality, or all subcarriers in the grouping. Such association may be time-dependent, e.g. configured or configurable or predefined, and/or dynamic or semi-static. The association may be different for different devices, e.g. configured or configurable or predefined, and/or dynamic or semi-static. Patterns of subcarrier groupings may be considered, which may comprise one or more subcarrier groupings (which may be associated to same or different signalings/channels), and/or one or more groupings without associated signaling (e.g., as seen from a specific device). An example of a pattern is a comb, for which between pairs of groupings associated to the same signaling/channel there are arranged one or more groupings associated to one or more different channels and/or signaling types, and/or one or more groupings without associated channel/signaling). It should be noted that utilised resource structures or resource may appear shifted in time between a transmitter and receiver, during path traveling time of signaling between them. Nevertheless, the use of resources is well-defined from each transmitter's and receiver's point of view, as it may be assumed that they are aware of such delays.

Example types of signaling comprise signaling of a specific communication direction, in particular, uplink signaling, downlink signaling, sidelink signaling, as well as reference signaling (e.g., SRS or CRS or CSI-RS), communication signaling, control signaling, and/or signaling associated to a specific channel like PUSCH, PDSCH, PUCCH, PDCCH, PSCCH, PSSCH, etc.).

URLLC may represent a quality requirement on signaling, e.g. regarding latency and/or reliability (e.g., in terms or BLER or BER), which may be higher or stricter than eMBB, which may aim at less time-critical/reliable signaling than URLLC signaling.

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other variants and variants that depart from these specific details.

For example, the concepts and variants are partially described in the context of Long Term Evolution (LTE) or LTE-Advanced (LTE-A) or New Radio mobile or wireless communications technologies; however, this does not rule out the use of the present concepts and aspects in connection with additional or alternative mobile communication technologies such as the Global System for Mobile Communications (GSM). While described variants may pertain to certain Technical Specifications (TSs) of the Third Generation Partnership Project (3GPP), it will be appreciated that the present approaches, concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the variants described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. The aspects presented herein can be varied in many ways.

Some useful abbreviations comprise

| Abbreviation | Explanation |
|---|---|
| ACK/NACK | Acknowledgment/Negative Acknowledgement |
| ARQ | Automatic Repeat reQuest |
| BER | Bit Error Rate |
| BLER | Block Error Rates |
| CAZAC | Constant Amplitude Zero Cross Correlation |
| CB | Code Block |
| CBG | Code Block Group |
| CDM | Code Division Multiplex |
| CM | Cubic Metric |
| CQI | Channel Quality Information |
| CRC | Cyclic Redundancy Check |
| CRS | Common reference signal |
| CSI | Channel State Information |
| CSI-RS | Channel state information reference signal |
| DAI | Downlink Assignment Indicator |
| DCI | Downlink Control Information |
| DFT | Discrete Fourier Transform |
| DM(—)RS | Demodulation reference signal(ing) |
| eMBB | enhanced Mobile BroadBand |
| FDD | Frequency Division Duplex |
| FDM | Frequency Division Multiplex |
| FEC | Forward Error Correction/Coding |
| HARQ | Hybrid Automatic Repeat Request |
| IFFT | Inverse Fast Fourier Transform |
| MAC | Medium Access Control |

-continued

| Abbreviation | Explanation |
|---|---|
| MBB | Mobile Broadband |
| MCS | Modulation and Coding Scheme |
| MIMO | Multiple-input-multiple-output |
| MRC | Maximum-ratio combining |
| MRT | Maximum-ratio transmission |
| MU-MIMO | Multiuser multiple-input-multiple-output |
| OFDM/A | Orthogonal Frequency Division Multiplex/Multiple Access |
| PAPR | Peak to Average Power Ratio |
| PDCCH | Physical Downlink Control Channel |
| PDSCH | Physical Downlink Shared Channel |
| PRACH | Physical Random Access CHannel |
| PRB | Physical Resource Block |
| PUCCH | Physical Uplink Control Channel |
| PUSCH | Physical Uplink Shared Channel |
| (P)SCCH | (Physical) Sidelink Control Channel |
| (P)SSCH | (Physical) Sidelink Shared Channel |
| RAN | Radio Access Network |
| RAT | Radio Access Technology |
| RB | Resource Block |
| RNTI | Radio Network Temporary Identifier |
| RRC | Radio Resource Control |
| SA | Scheduling Assignment |
| SC-FDM/A | Single Carrier Frequency Division Multiplex/Multiple Access |
| SCI | Sidelink Control Information |
| SINR | Signal-to-interference-plus-noise ratio |
| SIR | Signal-to-interference ratio |
| SNR | Signal-to-noise-ratio |
| SR | Scheduling Request |
| SRS | Sounding Reference Signal(ing) |
| SVD | Singular-value decomposition |
| TB | Transport Block |
| TDD | Time Division Duplex |
| TDM | Time Division Multiplex |
| UCI | Uplink Control Information |
| UE | User Equipment |
| UL-SCH | Uplink Shared Channel, mapped to a PUSCH |
| URLLC | Ultra Low Latency High Reliability Communication |
| VL-MIMO | Very-large multiple-input-multiple-output |
| ZF | Zero Forcing |

Abbreviations may be considered to follow 3GPP usage if applicable.

The invention claimed is:

1. A method of operating a wireless device in a wireless communication network, the wireless device being triggered for aggregated transmission of first control information associated to a control channel, the aggregated transmission corresponding to a number R of retransmissions of the first control information to be performed, the method comprising:

transmitting the first control information on a data channel that is determined based on a scaling parameter, the scaling parameter determined based on the number R of retransmissions, and the scaling parameter is the higher one of a minimum scaling parameter and a scaling parameter indicated with received control signaling, the minimum scaling parameter is determined based on one or more transmission quality parameters associated to the triggered transmission of first control information associated to at least one of the control channel and associated transmission quality.

2. The method according to claim 1, wherein the scaling parameter indicates at least one of:
a number of resource elements;
modulation symbols;
code rate; and
coding bits,
for transmitting the first control information on the data channel.

3. The method according to claim 1, wherein at least part of the retransmissions R are triggered for transmission in the same slot.

4. The method according to claim 1, wherein each retransmission is triggered for transmission on the same control channel resource.

5. The method according to claim 1, wherein different retransmissions are triggered for different subslots.

6. The method according to claim 1, wherein a number of repetitions Rd of the first control information used for transmitting the first control information on the data channel is less than R.

7. The method according to claim 1, wherein the first control information is transmitted on two different data channel instances.

8. The method according to claim 1, wherein the scaling parameter is configured or indicated with control signaling.

9. A wireless device for a wireless communication network, the wireless device configured for:
being triggered for aggregated transmission of first control information associated to a control channel, the aggregated transmission corresponding to a number R of retransmissions of the first control information to be performed; and
transmitting the first control information on a data channel that is determined based on a scaling parameter, the scaling parameter determined based on the number R of retransmissions, and the scaling parameter is the higher one of a minimum scaling parameter and a scaling parameter indicated with received control signaling, the minimum scaling parameter is determined based on one or more transmission quality parameters associated to the triggered transmission of first control information associated to at least one of the control channel and associated transmission quality.

10. A method of operating a network node in a wireless communication network, the method comprising:
receiving first control information from a wireless device, the wireless device being triggered for aggregated transmission of the first control information associated to a control channel, the aggregated transmission corresponding to a number R of retransmissions of the first control information to be performed, receiving comprising receiving the first control information on a data channel that is determined based on a scaling parameter, the scaling parameter determined based on the number R of retransmissions, and the scaling parameter is the higher one of a minimum scaling parameter and a scaling parameter indicated with received control signaling, the minimum scaling parameter is determined based on one or more transmission quality parameters associated to the triggered transmission of first control information associated to at least one of the control channel and associated transmission quality.

11. The method according to claim 10, wherein at least part of the retransmissions R are triggered for transmission in the same slot.

12. The method according to claim 10, wherein each retransmission is triggered for transmission on the same control channel resource.

13. The method according to claim 10, wherein different retransmissions are triggered for different subslots.

14. The method according to claim 10, wherein a number of repetitions Rd of the first control information used for transmitting the first control information on the data channel is less than R.

15. The method according to claim 10, wherein the first control information is transmitted on two different data channel instances.

16. The method according to claim 10, wherein the scaling parameter indicates at least one of:
a number of resource elements;
modulation symbols;
code rate; and
coding bits,
for transmitting the first control information on the data channel.

17. A network node for a wireless communication network, the network node configured for:
receiving first control information from a wireless device, the wireless device being triggered for aggregated transmission of the first control information associated to a control channel, the aggregated transmission corresponding to a number R of retransmissions of the first control information to be performed, receiving comprising receiving the first control information on a data channel that is determined based on a scaling parameter, the scaling parameter determined based on the number R of retransmissions, and the scaling parameter is the higher one of a minimum scaling parameter and a scaling parameter indicated with received control signaling, the minimum scaling parameter is determined based on one or more transmission quality parameters associated to the triggered transmission of first control information associated to at least one of the control channel and associated transmission quality.

18. A computer storage medium storing a computer program comprising instructions configured to cause processing circuitry to at least one of control and perform a method of operating a wireless device in a wireless communication network, the wireless device being triggered for aggregated transmission of first control information associated to a control channel, the aggregated transmission corresponding to a number R of retransmissions of the first control information to be performed, the method comprising:
transmitting the first control information on a data channel that is determined based on a scaling parameter, the scaling parameter determined based on the number R of retransmissions, and the scaling parameter is the higher one of a minimum scaling parameter and a scaling parameter indicated with received control signaling, the minimum scaling parameter is determined based on one or more transmission quality parameters associated to the triggered transmission of first control information associated to at least one of the control channel and associated transmission quality.

* * * * *